Feb. 1, 1966    G. H. RAWCLIFFE    3,233,159
ROTARY ELECTRIC MACHINES
Filed June 13, 1961    22 Sheets-Sheet 1

INVENTOR
Gordon Hindle Rawcliffe
BY
Stevens, Davis, Miller and Mosher
ATTORNEYS

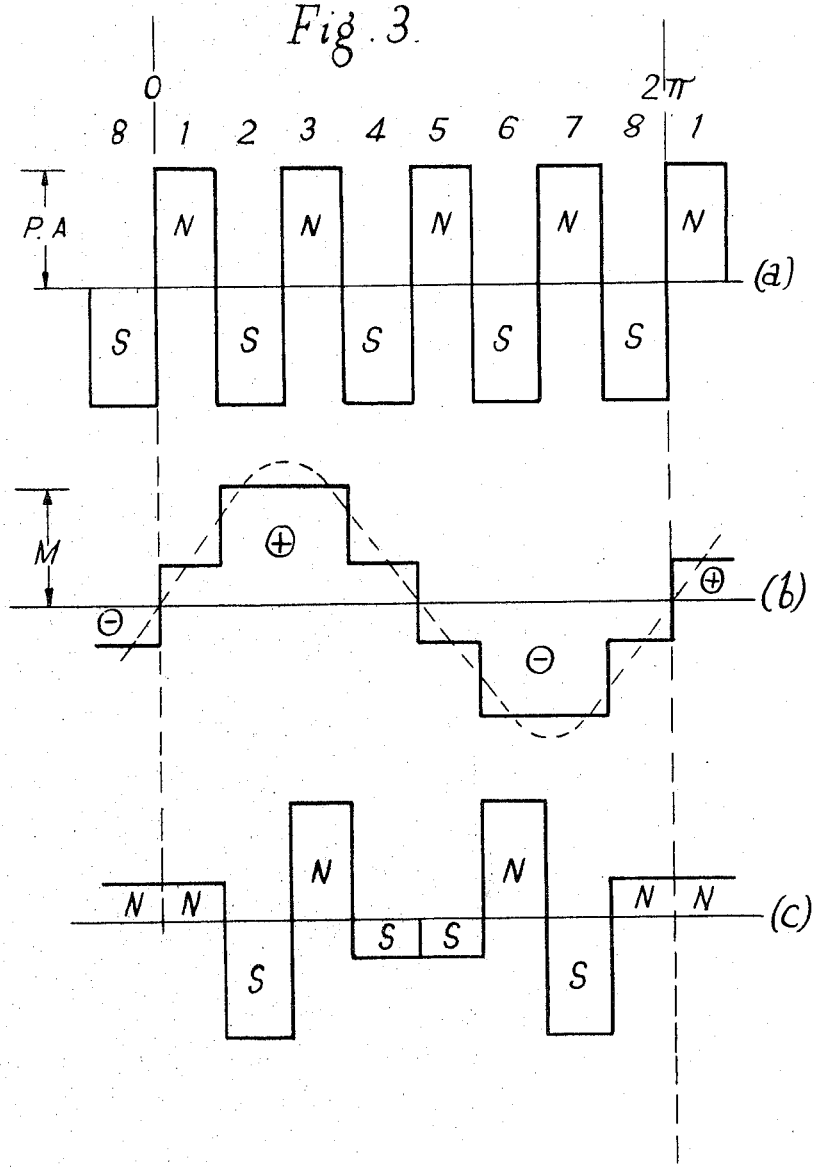

PARALLEL UNMODULATED

SERIES MODULATED

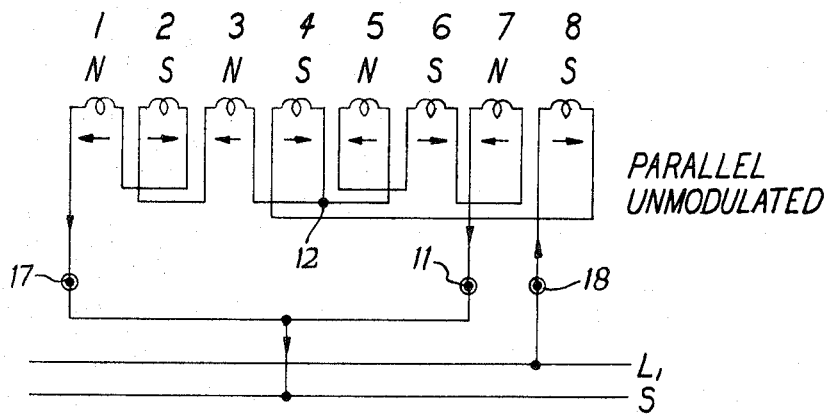
Fig.6(a) PARALLEL MODULATED / PARALLEL UNMODULATED
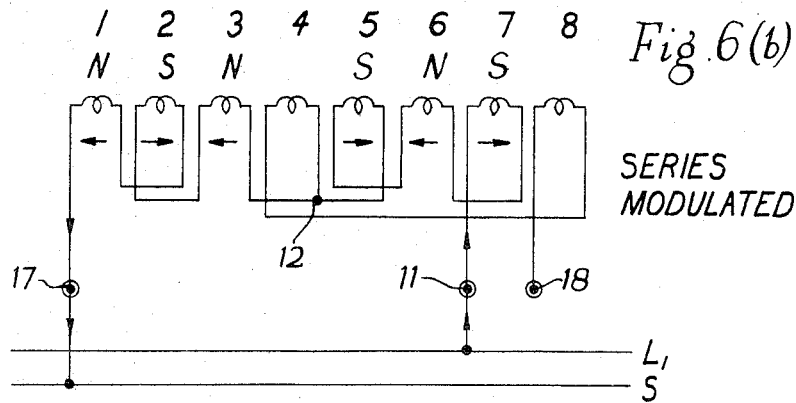
Fig.6(b) SERIES MODULATED

PARALLEL UNMODULATED

SERIES MODULATED

INVENTOR
Gordon Hindle Rawcliffe
BY
Stevens, Davis, Miller and Mosher
ATTORNEYS

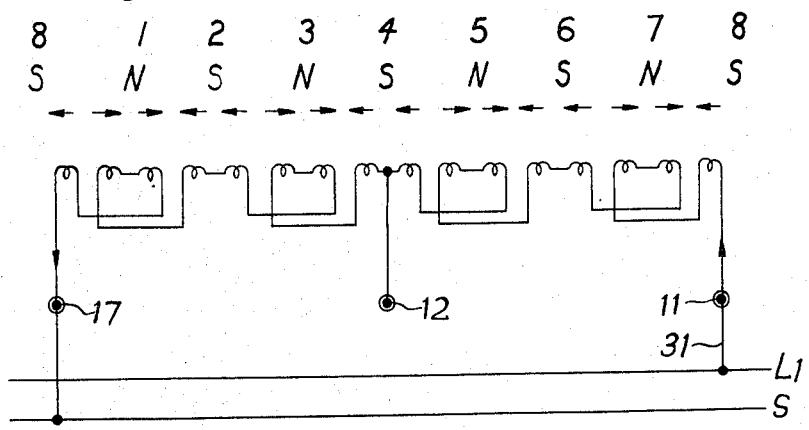
Fig. 8(a) SERIES UNMODULATED
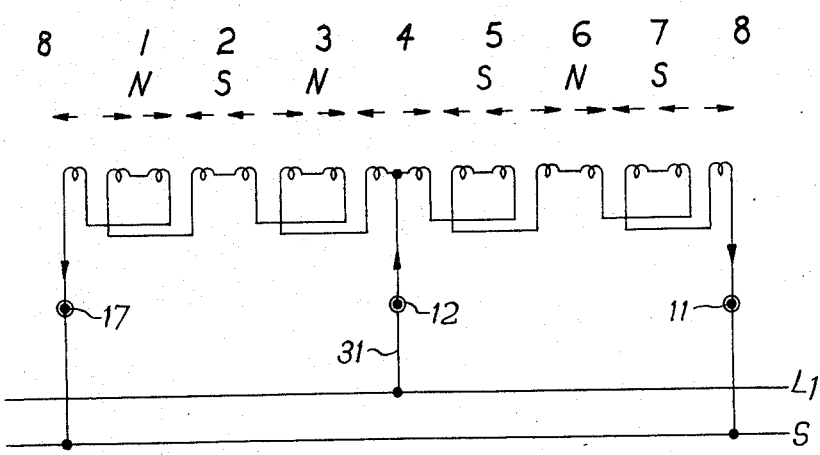
Fig. 8(b) PARALLEL MODULATED

Fig. 9(a) PARALLEL UNMODULATED
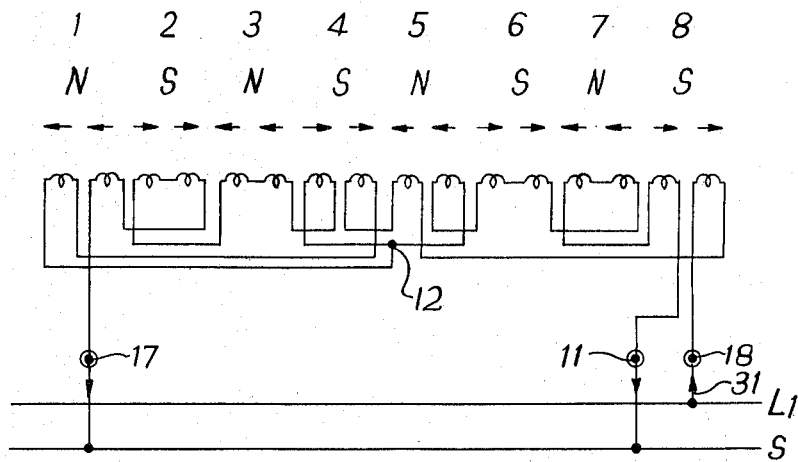
Fig. 9(b) SERIES MODULATED
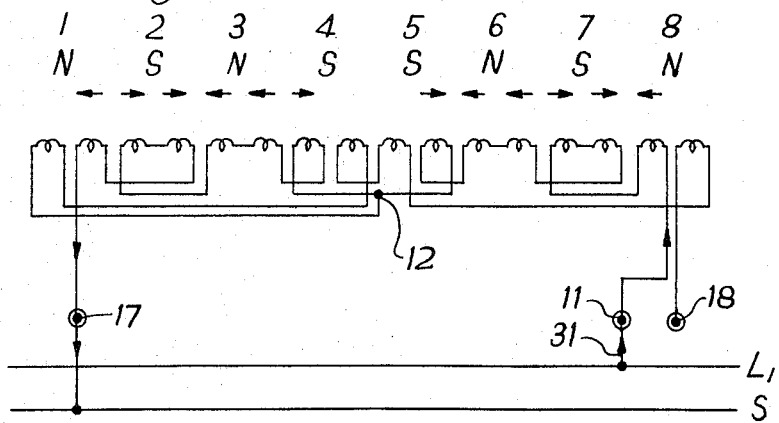

PARALLEL UNMODULATED

SERIES MODULATED

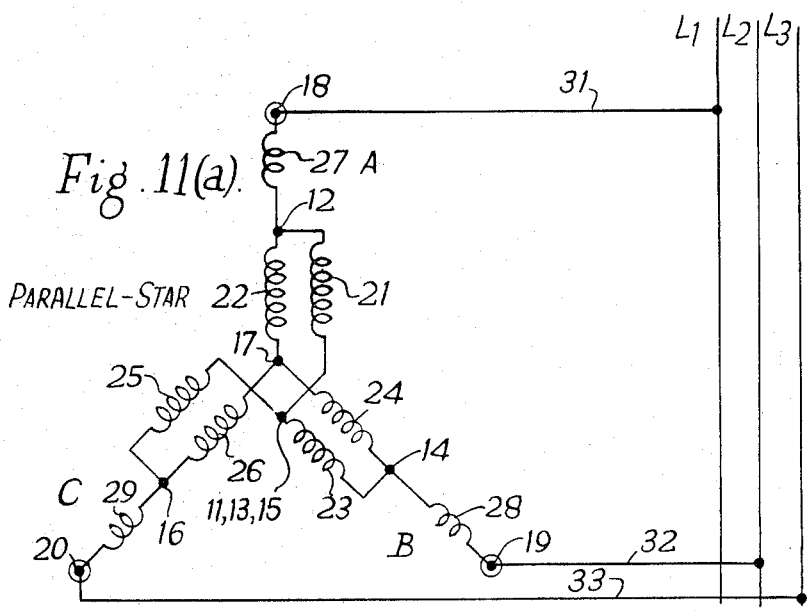
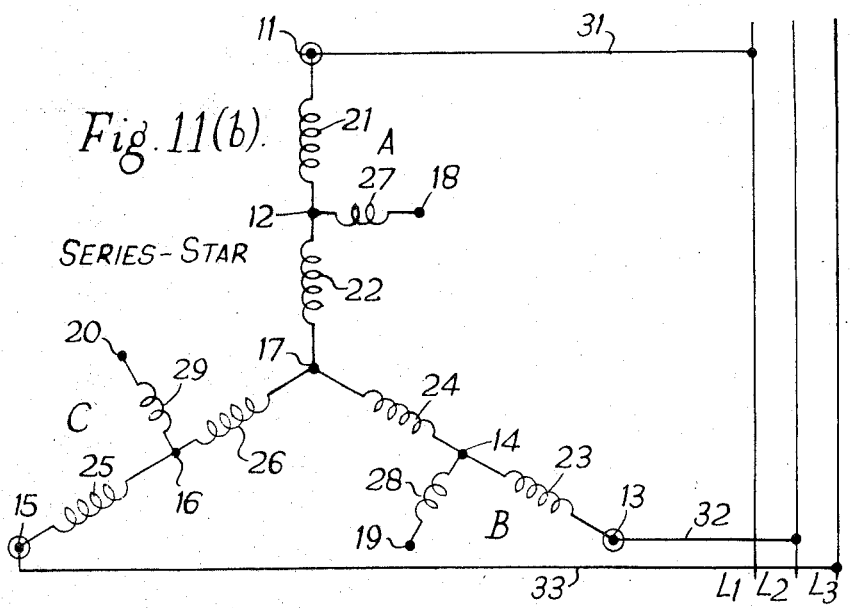

Feb. 1, 1966 G. H. RAWCLIFFE 3,233,159
ROTARY ELECTRIC MACHINES
Filed June 13, 1961 22 Sheets-Sheet 14

```
PHASE  A   2-4-4-2 —— 2-4-4-2 —— STARTING FROM : "X"
PHASE  B   1-3-5-3 —— 1-3-5-3 ——     "        "   "Y"
PHASE  C   3-5-3-1 —— 3-5-3-1 ——     "        "   "Z"
```

INVENTOR
Gordon Hindle Rawcliffe
BY
Stevens, Davis, Miller and Mosher
ATTORNEYS

Feb. 1, 1966 G. H. RAWCLIFFE 3,233,159
ROTARY ELECTRIC MACHINES
Filed June 13, 1961 22 Sheets-Sheet 15

INVENTOR
Gordon Hindle Rawcliffe
BY
Stevens, Davis, Miller and Mosher
ATTORNEYS

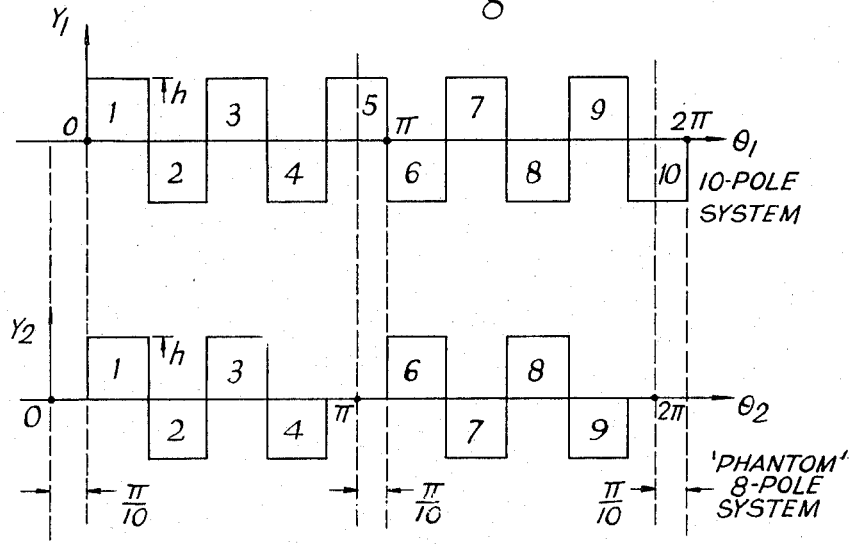
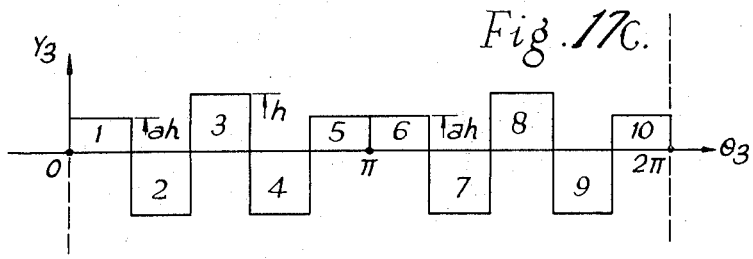
FOR $a = \frac{1}{4}$

Feb. 1, 1966 G. H. RAWCLIFFE 3,233,159
ROTARY ELECTRIC MACHINES
Filed June 13, 1961 22 Sheets-Sheet 17

INVENTOR
Gordon Hindle Rawcliffe
BY
Stevens, Davis, Miller and Mosher
ATTORNEYS

Feb. 1, 1966   G. H. RAWCLIFFE   3,233,159
ROTARY ELECTRIC MACHINES
Filed June 13, 1961   22 Sheets-Sheet 18

INVENTOR
Gordon Hindle Rawcliffe
BY
Stevens, Davis, Miller and Mosher
ATTORNEYS

INVENTOR
Gordon Hindle Rawcliffe
BY
Stevens, Davis, Miller and Mosher
ATTORNEYS

# United States Patent Office 3,233,159
Patented Feb. 1, 1966

3,233,159
ROTARY ELECTRIC MACHINES
Gordon Hindle Rawcliffe, Clifton, Bristol, England, assignor to National Research Development Corporation, London, England
Filed June 13, 1961, Ser. No. 116,742
Claims priority, application Great Britain, Aug. 28, 1957, 27,112/57; May 28, 1958, 17,022/58; July 18, 1958, 23,070/58; Dec. 2, 1958, 38,851/58; May 29, 1959, 18,410/59, 18,411/59; Oct. 16, 1959, 35,074/59
36 Claims. (Cl. 318—224)

This application is a continuation-in-part of applicant's copending application Serial No. 757,029 filed August 25, 1958 and now abandoned; Serial No. 825,556 filed July 7, 1959 and now abandoned; Serial No. 854,653 filed November 23, 1959, now Patent No. 3,049,653; and Serial No. 59,071 filed September 28, 1960, now Patent No. 3,070,734.

This invention relates to three-phase pole-changing rotary electric machines and in particular to the three-phase windings thereof.

Pole-changing induction motors, providing two alternative pole-numbers and two running speeds in inverse ratio to the two alternative pole-numbers are well-known and widely used in practice. Best-known are machines providing alternative pole numbers in the ratio 2:1, but 3:1 ratio machines are also known.

The 2:1 ratio machine, often known as the Dahlander machine, has switching connections brought out from the ends and from the center points of the three phase-windings to provide alternative series or parallel connections of the phase-winding halves, one connection providing twice the number of poles in each phase relatively to the other connection.

The 3:1 ratio machine similarly has switching connections brought out from the phase windings to provide alternative series or parallel connections of the phase-winding thirds and the corresponding alternative pole-numbers for each phase.

This technique of series-parallel switching can be extended to provide other pole-number ratios. In theory at least, every coil of a phase-winding could be brought out separately by switching connections, so providing a large variety of series-parallel combinations and a corresponding number of alternative pole-numbers, and similarly for the other two phase-windings.

Thus, in technical and patent literature, there has been described a number of machines which, while they do not go to the extreme of bringing out connections from every coil, bring out many switching connections, so as to provide alternative pole-numbers for each phase-winding, in various ratios, including close ratios less than 2:1.

In practice, bringing out large numbers of switching leads is objectionable, so that such machines are not widely used as are the 2:1 and 3:1 ratio machines.

One object of the present invention is to provide a machine having alternative pole-numbers in close-ratio, less than 2:1, requiring only an acceptably small number of switching connections to the phase-windings.

Another object of the present invention is to provide a new method of pole-changing for a 3-phase winding wound to provide a first pole-number by creating two alternative pole-numbers and eliminating one, so that the other alternative pole-number becomes operative.

This new method of pole-changing is described herein and its theory is explained, so that the method may be applied by a person skilled in the art to many different pole-number alternatives.

Another object of the invention is to provide a 3-phase-winding for a rotary electric machine to provide pole-changing by the method disclosed.

Another object is to provide a pole-changing induction motor using such a 3-phase winding.

Another object is to provide a pole-changing synchronous machine using such a 3-phase winding in combination with a pole-changing field winding.

The object of a particular form of the invention is to provide an improved pole-changing field winding for such a synchronous machine.

The object of another form of the invention is to provide a pole-changing 3-phase winding as stated above, where neither pole-number is 3 pole-pairs or a multiple thereof, wherein all phase-windings are identical.

The object of another form of the invention is to provide a pole-changing 3-phase winding as stated above, where one pole-number is 3 pole-pairs or a multiple thereof, wherein two phase-windings differ in construction from the third.

Yet another object of the invention is to provide a machine with pole-changing by the method of the invention arranged for continuously variable control of the running speed.

Other objects will be evident from the full explanation of the invention and description of the practical embodiments thereof which follow.

It will assist in a clear and ready understanding of this full explanation of the invention to explain briefly that the method of pole-changing according to this invention consists in first choosing a 3-phase winding for the first of the required alternative pole-numbers. Electrically, and in other respects except for the provision of switching connections, this winding is a conventional winding such as might be provided for a single-speed motor of the same pole-number.

To provide the second pole-number, the magnetomotive force waveform corresponding to the first pole-number, for each phase-winding, is modulated in amplitude around the circumference of the machine according to a regular cyclic modulating wave having alternating positive and negative half-cycles. This pole-amplitude modulation of the original M.M.F. waveform is effected by switching so that certain phase-winding parts are reversed as regards the direction of current flow therein. The effect of such pole-amplitude modulation is to produce a new M.M.F. waveform corresponding to two new pole-numbers together, in each phase-winding, instead of the original pole-number. One of the new pole-numbers is higher than the original pole-number, the other new pole-number is an equal number of poles lower than the original pole-number. Clearly, the machine cannot operate according to both new pole-numbers simultaneously, and it is necessary to eliminate one or the other of them.

Either one of the new pole-numbers is eliminated, at choice, leaving the other new pole-number as the operative pole-number, alternative to the original pole-number. By the method of the present invention, the unwanted pole-number is eliminated by choice of the spacing of the three phase-windings around the machine circumference, so that the components of the unwanted pole-number in the three phase-windings together cancel out one another in the resultant 3-phase field.

This two-step method, by which two new pole-numbers are first created and then one of them is eliminated in the three-phase field, to leave the other new pole-number alone, clearly distinguishes the present invention from previous pole-changing arrangements. In the known pole-changing machines, the alternative pole-numbers have been provided, one pole number at a time, in each one of the phase-windings considered individually. The pole-changing has been effected solely by switching. The spacing of the phase-windings is arbitrary.

The spacing of the phase-windings, in a machine according to the present invention, is not arranged at the time of pole-changing, because it results from the actual physical construction of the machine. The required phase-winding spacing to eliminate the unwanted modulated pole-number is decided before the machine is built. The required spacing of the phase-windings does not affect operation at the original, unmodulated, pole-number. The machine, once built up with the correct phase-winding spacing, can then provide either the unmodulated pole-number or the chosen modulated pole-number solely by the switching operation.

The above explanation is intentionally simplified for clarity. Factors affecting the choice between the two modulated pole-numbers and a more precise way of defining the spacing will be evident from the full explanation which follows.

The full explanation of the method of pole-changing and a number of practical embodiments is given with reference to the accompanying drawings.

It is to be specifically understood that the embodiments shown in the drawings are by way of example only. The scope of the invention is defined by the appended claims and is not limited to the particular examples chosen.

In the accompanying drawings:

FIGS. 1 through 4 are series of waveform diagrams which shown four different forms of pole-amplitude modulation;

FIGS. 5(a), 5(b), 6(a), 6(b), 7(a), 7(b), 8(a), 8(b), 9(a), 9(b), 10(a) and 10(b) are circuit diagrams showing alternative connections of the coils of a single phase-winding providing alternative unmoluated and modulated M.M.F. waveforms;

FIGS. 11(a), 11(b), 12(a) and 12(b) are circuit diagrams showing alternative connections of three phase-windings for unmodulated and modulated conditions;

FIGS. 13(a), 13(b) and 13(c) are diagrams showing the elimination of an unwanted pole-number and the special significance of pole-numbers which are three pole-pairs or a multiple thereof;

Figure 16A:
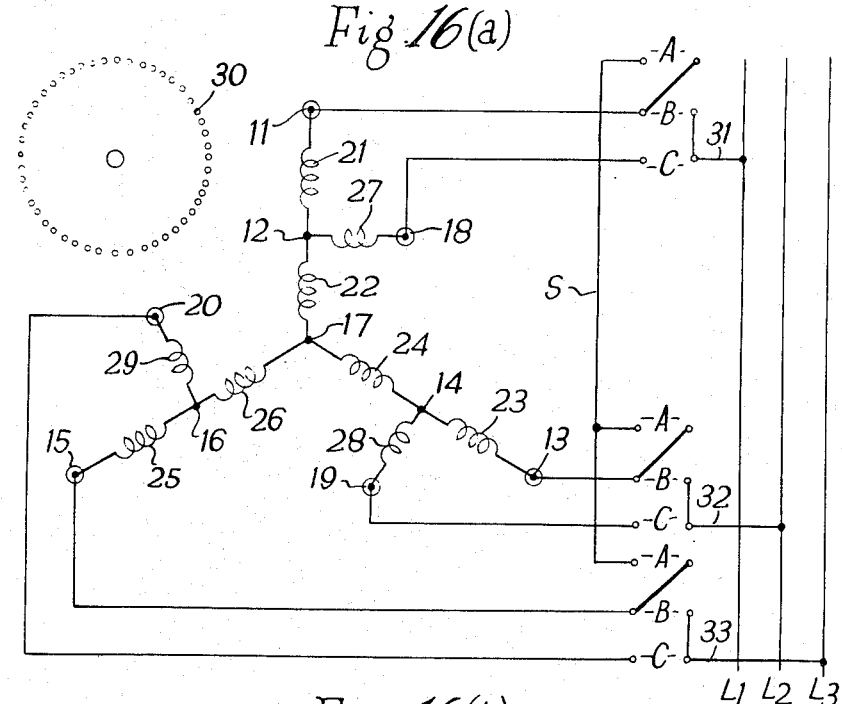
Figure 16B:
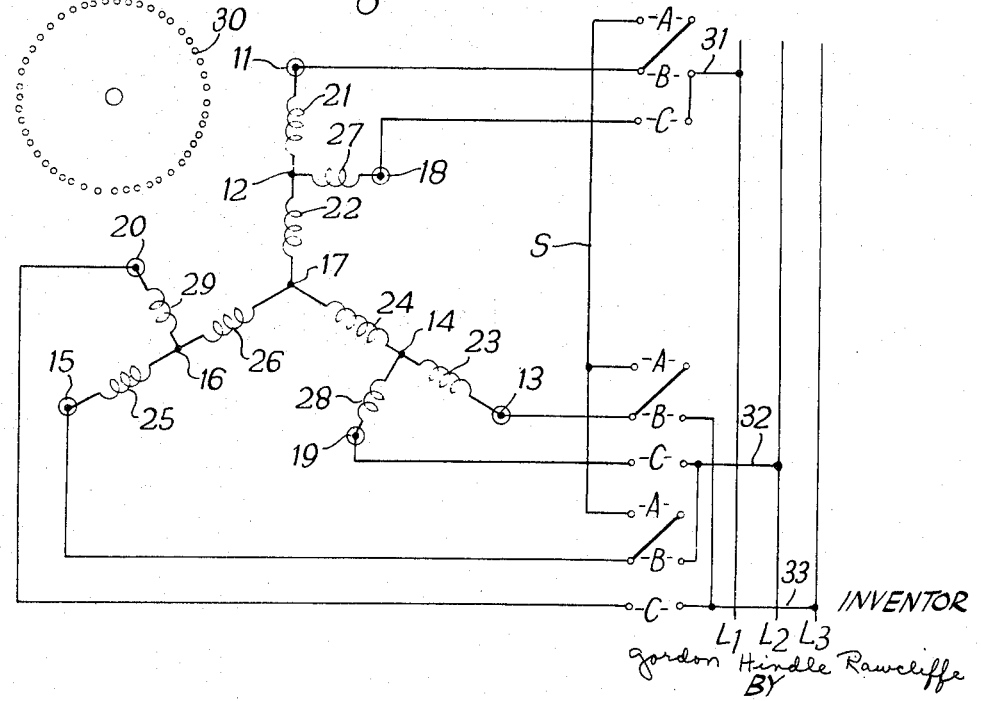

FIGS. 16(a) and 16(b) are circuit diagrams of switching connections for pole-changing and reversal of rotation;

FIGS. 17(a), 17(b), 17(c), 18, 19, 20 and 21 are diagrams showing pole-changing field windings for use in a synchronous machine;

FIGS. 22, 23, 24 and 25 are slot winding diagrams of four machines chosen as representative examples of machines providing pole-changing by the method of the invention.

I. *Pole-amplitude modulation*

FIGS. 1 through 4 are waveform diagrams showing the magnetomotive force distribution of one phase of a 3-phase, 8-pole winding. In all the figures, the horizontal axes of the waveform diagram represents angular distance round the circumference of the phase-winding. Point "O" is taken arbitrarily as the origin of all the waveforms and point "$2\pi$" represents a single revolution around the winding axis. The vertical axis in all diagrams represents amplitude.

In FIG. 1(a), eight poles of an integral slot winding, of alternating polarity and all of equal pole-amplitude, represented by the arrow "P," are shown in the full circumferential length of the phase-winding.

FIG. 1(b) shows a modulation wave of cyclic form throughout a single cycle having a positive value of unity, represented by the arrow "M;" extending for three poles of the waveform of FIG. 1(a) and a value zero extending for one pole length to the half-circumference point of the phase-winding. For the second half of the circumferential length, the shape of the modulation wave is repeated in negative sense. A portion having the negative value of unity extends for three pole lengths and finally a portion of zero amplitude extends for the last pole.

The modulation of pole-amplitude represented by the waveform of FIG. 1(b) is obtained by leaving unchanged the part of the phase-winding providing the three poles within the positive part of the modulation wave.

Where the modulation wave is zero, for the 4th and 8th poles, the corresponding part of the phase-winding is omitted from circuit. Alternatively, the two coils, or the two coil groups, of the phase-winding which provide the 4th and the 8th pole may each be wound in two equal parts serially connected in aiding relationship to provide the waveform of FIG. 1(a). For modulation, the two parts are connected serially in opposition, so that the field of the one part cancels the field of the other part. The resultant pole-amplitude is then substantially zero.

Where the modulation wave is negative, for the 5th through 7th poles, the corresponding phase-winding part is reversed, in circuit to provide the opposite sense of current flow therein from the phase-winding part corresponding to the 1st through 3rd poles.

The connection of phase-winding parts which remain energised in the modulated connection is defined in this way, in terms of the relative sense of current flow in the two parts, because the sense of connection in the 3-phase circuit of the phase-winding as a whole is also dependent upon the sense of rotation required for the machine. This matter is explained later herein.

The resultant modulated M.M.F. waveform is shown in FIG. 1(c). It will be seen that poles 1 through 3 remain unchanged, poles 5 through 7 are reversed in polarity but remain of the same amplitude and poles 4 and 8 are reduced to zero amplitude.

This modulated M.M.F. waveform of FIG. 1(c) represents the resultant of two separate component waveforms, one of 10-poles and the other of 6-poles.

This fact, which is readily proved by mathematical analysis of the operation as well as by the practical reduction to practice of the invention, is one of the two principles upon which this invention is based. It provides the first step in the pole-changing method by which two new pole-numbers are created. The elimination of the unwanted pole-number is dealt with later.

Figure 5A:
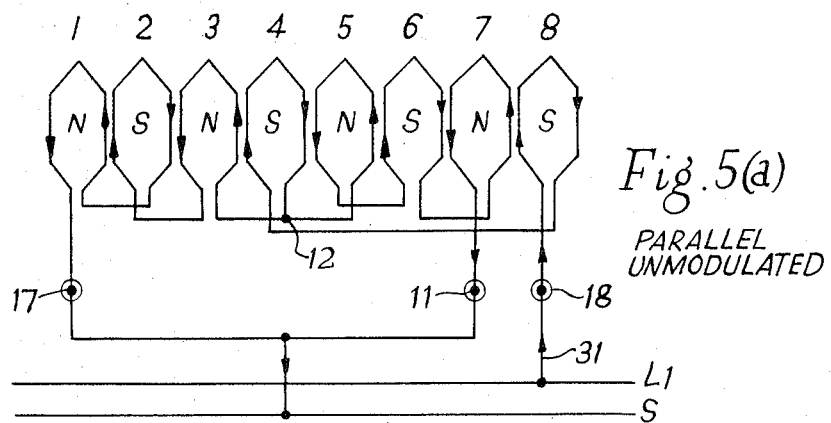
Figure 5B:
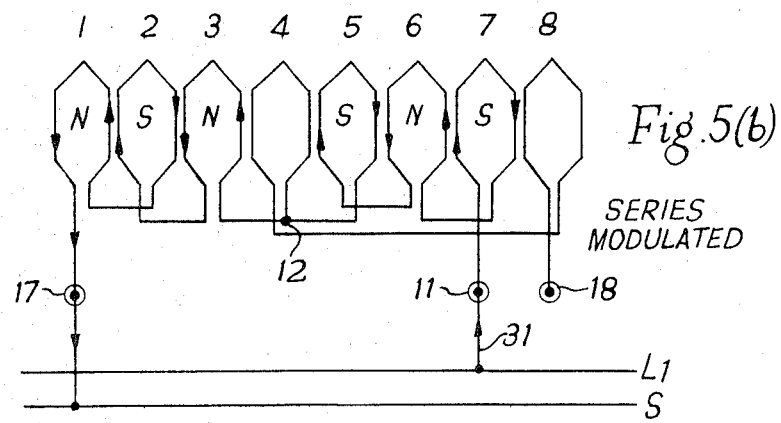

Reference is now made to FIG. 5(a) and FIG. 5(b) which are conventional circuit diagrams showing one phase-winding of a 3-phase, 8-pole integral slot winding in parallel unmodulated connection and series modulated connection, respectively. For clarity, each coil, or coil group, of the winding is shown as a single loop. Each loop is numbered according to the number of the pole produced thereby.

Reference is concurrently made to FIG. 6(a) and FIG. 6(b) showing the same phase-winding as FIGS. 5(a) and 5(b), in the same alternative connections respectively, the coils, or coil groups, being represented in a different schematic form. This different schematic form is clearer for describing the more complicated phase-winding arrangements of FIGS. 7 through 10.

In FIGS. 5(a), 5(b), 6(a) and 6(b) coils 1 through 3 are serially connected between terminals 17 and 12. Coils 5 through 7 are serially connected between terminals 12 and 11. Coils 4 and 8 are serially connected in a separate branch between terminals 12 and 18.

In FIGS. 5(a) and 6(a) terminal 18 is connected to phase line $L_1$ by connection 31. Terminals 11 and 17 are both connected to line S or star center point. This connection provides current flow through the phase-winding in the direction of the arrows shown, the two major parts of the phase-winding being connected in parallel.

It will be seen that this connection provides the M.M.F. waveform of FIG. 1(a).

In FIGS. 5(b) and 6(b), terminal 17 remains connected to line S, terminal 11 is connected to line $L_1$ by conductor 31 and terminal 18 is isolated. The two major parts of the phase-winding are now connected in series and the minor part is omitted from circuit.

It will be seen that this series connection provides the waveform of FIG. 1(c), that is to say reconnection of the phase-winding parts has applied the modulation wave of FIG. 1(b) to the original M.M.F. waveform of FIG. 1(a). Coils 1 through 3 remain unchanged in circuit, thus poles 1 through 3 remain unchanged in polarity. Reversal of polarity of poles 5 through 7 is effected by reversing the sense of current flow in coils 5 through 7 relatively to the sense of flow in coils 1 through 3. Reduction of poles 4 and 8 to zero amplitude is effected by omitting coils 4 and 8 from circuit.

FIGS. 11(a) and 11(b) show one way of providing alternative connections to all three phase-windings of a 3-phase winding to provide in each the alternative parallel connection of FIGS. 5(a), 6(a) and series connection of FIGS. 5(b), 6(b) respectively.

In FIGS. 11(a), 11(b) the phase-winding of FIGS. 5(a), 5(b), 6(a) and 6(b) is shown as phase-winding A with its terminal connections correspondingly numbered.

The phase-winding part corresponding to poles 1 through 3 is shown at 21, the part corresponding to poles 5 through 7 at 22 and the part corresponding to poles 4 and 8 at 27.

The phase-windings B and C are identical with phase-winding A. Phase-winding B has parts 23, 24 serially connected between terminals 13, 14 and 17 and a branch part 28 between terminals 19 and 14. Phase-winding C has parts 25, 26 serially connected between terminals 15, 16 and 17 and a branch part 29 between terminals 20 and 16.

In FIG. 11(a) the three phase-windings A, B and C are shown in parallel-star connection. The phase-windings are supplied at terminals 18, 19 and 20 by connections 31, 32 and 33 respectively from a 3-phase supply on lines $L_1$, $L_2$ and $L_3$. This provides the sense of current flow of FIGS. 5(a), 6(a) and the M.M.F. waveform of FIG. 1(a) for each of the three phase-windings.

In FIG. 11(b), the three phase-windings are shown in series star connection with the phase-winding parts 27, 28 and 29 omitted from circuit. The phase-windings are supplied at terminals 11, 13 and 15 by the connections 31, 32 and 33 respectively from the 3-phase supply on lines $L_1$, $L_2$ and $L_3$. This provides the sense of current flow of FIGS. 5(b), 6(b) and the M.M.F. waveform of FIG. 1(c) for each of the three phase-windings.

Assuming, in this example, that each pole is created by a single coil group, it is convenient to represent this winding in its unmodulated connection by the notation:

$$+1, +1, +1, +1, \quad +1, +1, +1, +1,$$

and in the modulated connection thus:

$$+1, +1, +1, 0, \quad -1, -1, -1, 0,$$

where the signs "+" and "−" indicate the relative sense of current flow and "0" indicates a coil omitted from circuit.

It will be noticed from FIG. 11(a) that the minor phase-winding part 27 is series-connected with the two major parts 21, 22 in parallel with each other. Thus the conductors of the part 27 carry twice the current of the parts 21 and 22 taken individually. Similarly for the corresponding parts 28 and 29 of phase-windings B and C.

For this reason, it is necessary to wind both the coils 4 and 8 with half the number of turns and with conductors of twice the cross-section area, relative to coils 1, 2, 3, 5, 6 and 7.

Figure 7A:
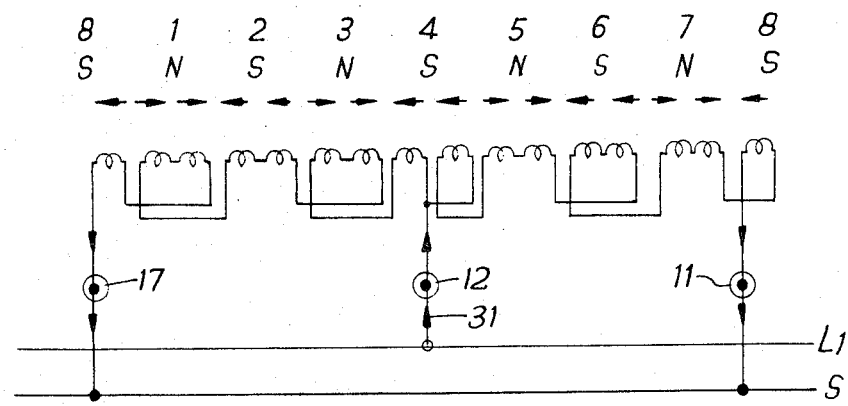
Figure 7B:
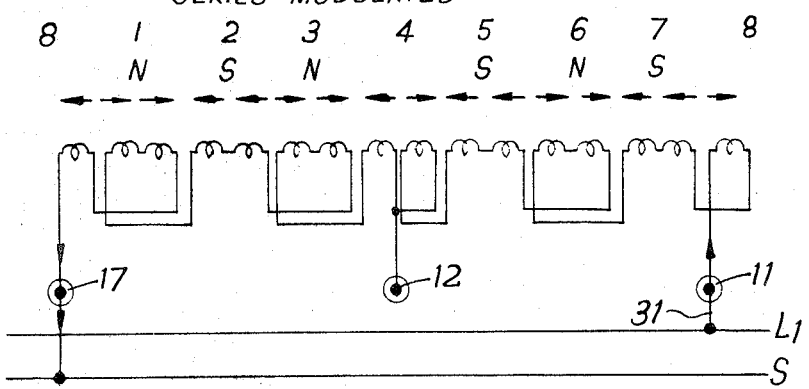

For phase-windings having an even number of slots per pole per phase, a modified arrangement as shown in FIGS. 7(a) and 7(b) is preferred, because it avoids the expedient mentioned in the preceding paragraph and also avoids the need to omit coils from circuit in the modulated connection.

FIGS. 7(a) and 7(b) show one phase-winding of a 3-phase winding having 8-poles and 2 slots per pole per phase. All the coils are serially connected between terminals 17 and 11. The second coil of pole 8, both coils of poles 1 through 3 and the first coil of pole 4 are connected between terminals 17 and 12. The second coil of pole 4, both coils of poles 5 through 7 and the first coil of pole 8 are connected between terminals 12 and 11.

In FIG. 7 (a), terminal 12 is supplied from phase-line $L_1$ through connection 31. Both terminals 11 and 17 are connected to line or star center point S. This connection provides current flow through the phase winding in the directions of the arrows. The resulting M.M.F. waveform is as shown in FIG. 1(a).

In FIG. 7(b), terminal 17 remains connected to star center point S, terminal 11 is now supplied by connection 31 from line $L_1$ and terminal 12 is isolated. Current flow in all that part of the winding between terminals 12 and 11 is now reversed. In particular, the direction of current flow in one coil of each of poles 4 and 8 is now opposite to that in the other coil thereof. The magnetic effect of the one coil cancels the other and poles 4 and 8 are neutralized. The M.M.F. waveform of FIG. 1(c) is again provided, but now by coil-opposition instead of coil omission.

In the notation previously used, the phase-winding of FIGS. 7(a) and 7(b) is represented, in the unmodulated connection, thus:

$$+2, +2, +2, +2, \quad +2, +2, +2, +2,$$

and in the modulated connection, thus:

$$+2, +2, +2, +1, -1, \quad -2, -2, -2, -1 +1,$$

Figure 12A:
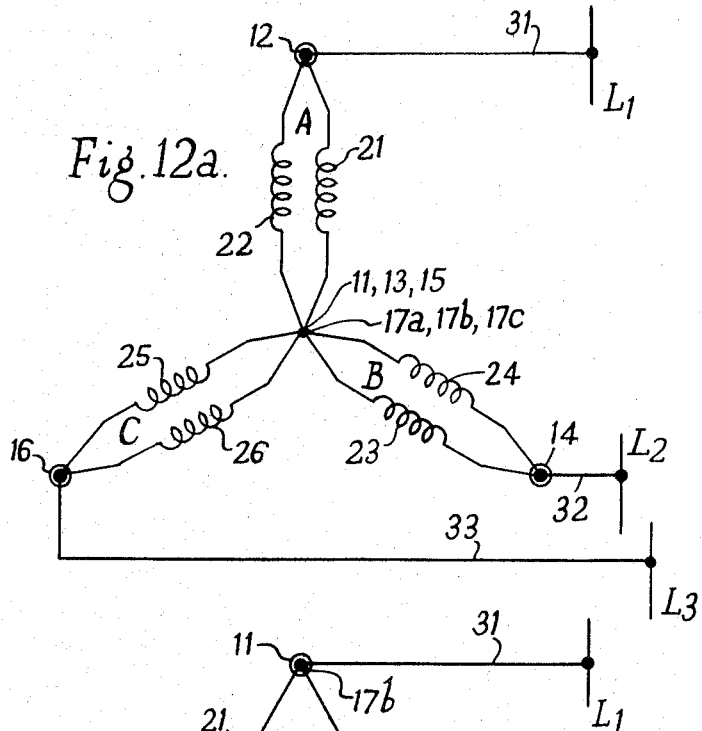
Figure 12B:
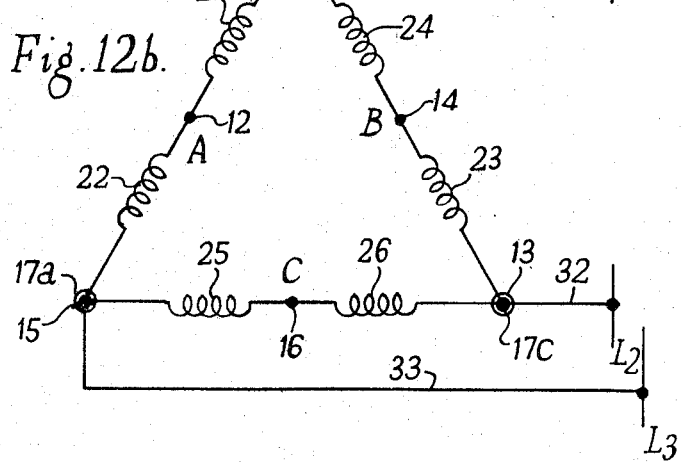

FIGS. 12(a) and 12(b) show respectively parallel star and series delta connections of three phase-windings. For the form shown in FIGS. 7(a) and 7(b), these correspond to the unmodulated and the modulated connections, respectively. The phase-winding of FIGS. 7(a) and 7(b) is shown as phase-winding A and has the terminal connections correspondingly numbered. The phase-winding part between terminals 11 and 12 is shown at 21 and the part between terminals 12 and 17a is shown at 22.

Phase-winding B comprises identical parts 23, 24 connected between terminals 13, 14 and 14, 17b. Phase-winding C comprises identical parts 25, 26 connected between terminals 15, 16 and 16, 17c. Terminal pairs 11, 17b; 13, 17c and 15, 17a are connected together permanently.

In the parallel star connection of FIG 12(a), terminals 11, 13 and 15 are connected together and terminals 12, 14 and 16 are supplied by conductors 31, 32 and 33 respectively from a 3-phase supply on lines $L_1$, $L_2$ and $L_3$.

In the series delta connection of FIG. 12(b), terminals 11, 13 and 15 are supplied by the conductors 31, 32 and 33 respectively from the 3-phase supply on lines $L_1$, $L_2$ and $L_3$ and terminals 12, 14 and 16 are isolated.

All coils of all phase-windings are connected in circuit for both the unmodulated and the modulated connections. The parallel coil connections or double section conductors of the parts 27, 28 and 29 of FIGS. 11(a) and 11(b) are avoided and also the circuit arrangement is simplified thereby.

In the coil group circuits of FIGS. 7(a) and 7(b) and in the other coil group circuits described herein which require no omission of coils from circuit in the modulated connection, it will be immediately evident to those skilled in the art that the polarity of the poles provided by the phase-winding part 21 between terminals 11 and 12, which becomes reversed in circuit, is arbitarily dependent upon the original phasing of the coils concerned. Thus, the unmodulated connection giving the waveform of FIG. 1(a) can equally well be provided by serial connection of the coils and the modulated connection, given the waveform of FIG. 1(c), by the parallel connection of the coils.

FIGS. 8(a) and 8(b) show the modified connections involved, compared respectively with the circuits of FIGS. 7(a) and 8(b).

For the modified 3-phase winding, the connections of FIG. 8(a) may be provided by the series delta connection of FIG. 12(b) and the connections of FIG. 8(b) by the parallel star connections of FIG. 12(a).

It will further be evident that instead of the alternative parallel delta and series star connection of FIGS. 12(a) and 12(b), the unmodulated and modulated conditions may instead be provided by parallel delta and series delta alternative connections. Such 3-phase circuit star/delta transformations are conventional and the changed permanent connections between the phase-winding ends and the changed switching connections need not be described herein.

The two phase-winding arrangements described so far provide the M.M.F. waveform of FIG. 1(c) in the modulated connection. However, it is more satisfactory in practice to provide a modulated waveform which varies in amplitude throughout the modulation cycle in a manner which is as nearly sinusoidal as possible. A nearer approach to sinusoidal pole amplitude variation is provided by the phase-winding M.M.F. waveforms represented in FIGS. 2(c), 3(c) and 4(c).

In the cases of FIGS. 2(c) and 3(c), the modulated waveform is derived from integral slot per pole per phase windings using the more nearly sinusoidal shape of the modulation waves of FIGS. 2(b) and 3(b) respectively. In the case of FIG. 4(c), the modulated waveform is obtained by a fractional slot per pole per phase winding giving a cyclically varying amplitude distribution of the original unmodulated waveform.

FIG. 2(a) shows eight poles of one integral slot phase-winding, of alternating polarity and equal amplitude "PA," in the full circumference of the phase-winding.

FIG. 2(b) shows a modulation wave of cyclic form throughout a single cycle having a positive value of unity, represented by the arrow "M," extending over poles 2 and 3, a positive value of half amplitude for poles 1 and 4, a negative value of unity extending over poles 6 and 7 and a negative value of half amplitude for poles 5 and 8. It will be seen that this corresponds more nearly to a sinusoidal variation, as represented by the broken line superimposed on the figure, than does the modulation wave of FIG. 1(b).

The resultant modulated waveform is shown in FIG. 2(c). The reversal of polarity of poles 5 through 8 is obtained by reversal of the sense of current flow in the corresponding coil groups of the phase-winding. Reduction of amplitude of poles 1, 4, 5 and 8 is obtained by omitting from circuit one coil of each of the corresponding coil groups.

Suitable coil connections for one phase-winding are shown in FIGS. 9(a) and 9(b).

In the arrangements of FIGS. 9(a) and 9(b), which represents a single phase-winding of a 3-phase, 8-pole, 2 slot per pole per phase winding, the second coil of pole 1, both coils of poles 2 and 3 and the first coil of pole 4 are serially connected between terminals 17 and 12. The second coil of pole 5, both coils of poles 6 and 7 and the first coil of pole 8 are serially connected between terminals 12 and 11. The remaining coils of poles 1, 4, 5 and 8 are serially connected in a separate branch between terminals 12 and 18.

In FIG. 9( ) all coils are energised, terminal 18 being supplied by connection 31 from phase line $L_1$ and both terminals 11 and 17 being connected to star center point S. The resultant M.M.F. waveform is as shown in FIG. 2(a).

In FIG. 9(b), terminal 11 is supplied by connection 31 from phase line $L_1$ and terminal 17 remains connected to star center point S. Terminal 12 is isolated. Thus one coil of each of poles 1, 4, 5 and 8 is omitted from circuit, so that all these poles are reduced to half amplitude in this modulated connection. Moreover, the phase-winding part between terminals 12 and 11 is reversed in circuit, so that all of poles 5 through 8 are reversed in polarity. The resultant M.M.F. waveform is that shown in FIG. 2(c), that is to say, the modulation wave of FIG. 1(b) has been applied to the unmodulated 8-pole, M.M.F. waveform of the connection of FIG. 9(a).

Again, the M.M.F. waveform of FIG. 2(c) represents a 6-pole wave form and a 10-pole waveform combined. The relative amplitudes of the 6-pole and 10-pole components are different from the relative amplitudes in the M.M.F. waveform of FIG. 1(c).

The phase-winding of FIG. 9(a) is represented, in unmodulated connection thus:

+2, +2, +2, +2,    +2, +2, +2, +2 and in the modulated connection of FIG. 9(b) thus:

0.+1, +2, +2, +1.0,    0.−1, −2, −2, −1.0

For a 3-phase winding with each phase-winding connected as in FIGS. 9(a), 9(b) the unmodulated condition is provided by the parellel star connection of FIG. 11(a), in which the phase-winding of FIG. 9(a) is shown as phase-winding A. The major phase-winding parts are shown at 21 and 22. The single coils of poles 1, 4, 5 and 8 are shown at 27. The corresponding coils of phase-winding B and C are shown at 28 and 29 respectively and the major parts of those phase-windings at 23, 24 and 25, 26 respectively. Terminals 11, 13 and 15 are joined together and terminals 18, 19 and 20 are respectively supplied by connections 31, 32 and 33 from a 3-phase supply lines $L_1$, $L_2$ and $L_3$.

The alternative modulated condition is provided by the series star connection of FIG. 11(b). Terminals 11, 13 and 15 are supplied respectively by connections 31, 32 and 33 from lines $L_1$, $L_2$ and $L_3$ and terminals 18, 19 and 20 are isolated.

As in the arrangement of FIG. 6(b), selected coils are omitted from circuit in the modulated connection. The 2-slot per pole per phase winding described does not lend itself readily to amplitude reduction of the end coils 1, 4 and 5, 8 of the two modulation half-cycles by coil opposition instead of coil omission. Coil omission in the branch circuits 27, 28 and 29 can be avoided with integral slot phase-windings having an odd number of slots per pole per phase.

An example is shown in FIGS. 3(a), 3(b) and 3(c). FIG. 3(a) represents the M.M.F. waveform of one phase-winding of a 3-phase, 8-pole winding having 3 slots per pole per phase. FIG. 3(b) shows a modulation waveform providing reversal of polarity of poles 5 through 8 and reduction of amplitude to one-third the former amplitude of poles 1, 4, 5 and 8.

The circuit arrangement of the coils of the phase-winding is a simple variant of that shown in FIGS. 7(a) and 7(b) and it is not considered necessary to provide a circuit diagram of the coil groups of this phase-winding.

Instead of the 2 coil per pole of FIGS. 7(a) and 7(b), 3 coils per pole are serially connected. In the modulated connection, two of the three coils of poles 1, 4, 5 and 8 are phased to be in aiding relationship and one phased in opposition to provide a resultant M.M.F. of one-third amplitude.

In the unmodulated connection the phase-winding is represented by the notation:

+3, +3, +3, +3     +3, +3, +3, +3 and in the modulated connection thus:

−1, +2, +3, +3, +2, −1,     +1 −2, −3, −3, −2, +1

From this notation, it will be clear that the third coil of pole 8, the second and third coils of pole 1, all three coils of poles 2 and 3, the first and second coils of pole 4 and the first coil of pole 5 are serially connected between terminals 17 and 12. The third coil of pole 4, the second and third coils of pole 5, all three coils of poles 6 and 7, the first and second coils of pole 8 and the first coil of pole 1 are serially connected between terminals 12 and 11.

The M.M.F. waveform of FIG. 3(a) is provided in all three phase-windings by the parallel star connection of FIG. 12(a). The modulated M.M.F. waveform of FIG. 3(c) is provided by the series star connection of FIG. 12(b). Instead, the equivalent parallel star and series delta connections may be used.

Again, the M.M.F. waveform of FIG. 3(c) represents 6-pole and 10-pole component waveforms combined.

The required sinusoidal amplitude distribution of the modulated M.M.F. waveform may be obtained by suitable fractional slot phase windings. One example is shown in the diagrams of FIGS. 4(a), 4(b) and 4(c) and the circuit diagrams of FIGS. 10(a) and 10(b).

Figure 10A:
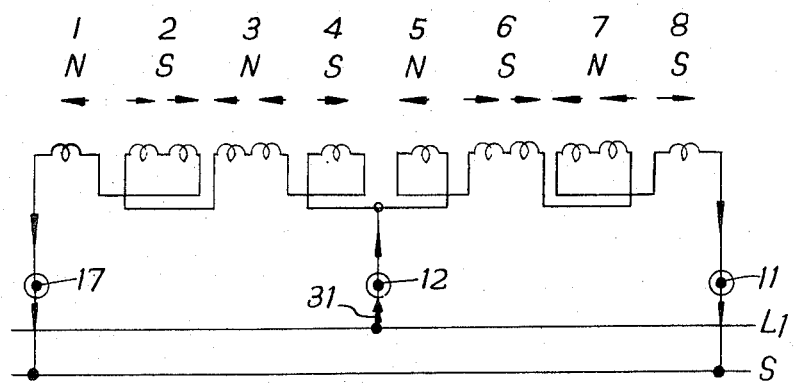
Figure 10B:
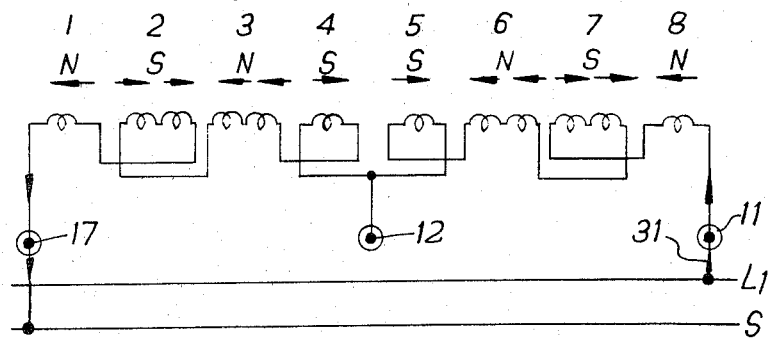

FIGS. 10(a) and 10(b) show one phase-winding of a 3-phase winding in which poles 1, 4, 5 and 8 are provided each by one coil and poles 2, 3, 6 and 7 are provided each by a coil group of two coils. In the unmodulated connection of FIG. 10(a), the cyclically varying M.M.F. waveform of FIG. 4(a) results. Poles 2, 3, 6 and 7 are of equal pole-amplitude of value "PA." Poles 1, 4, 5, and 8 are each of half the pole-amplitude "PA."

In the modulated connection of FIG. 10(b), solely the coils of poles 5 through 8, connected between terminals 11 and 12, are reversed in circuit relatively to the coils of poles 1 through 4, connected between terminals 12 and 17. From this connection the M.M.F. waveform of FIG. 4(c) results. This will be recognised as an identical waveform to that of FIG. 2(c) which was derived from an integral slot winding. In the case of the present fractional slot winding, the modulation wave is simply the positive and negative step function wave of FIG. 4(b) effected by current flow reversal in the phase-winding part to which the negative portion of the modulation wave is applied.

FIG. 4(c) represents exactly the same combination of 6-pole and 10-pole components M.M.F. waveforms as does FIG. 2(c).

It will be readily understood that a winding providing 10 poles unmodulated has 10 consecutive poles of alternate polarity in the condition of FIG. 4(a). The pole-amplitude modulation wave of FIG. 4(b) then provides 8-poles and 12-poles together in the resultant waveform corresponding to FIG. 4(c).

Furthermore, the coil grouping is not restricted to the 1–2–2–1–1–2–2–1 example of FIG. 4(a) but may be for example for a 10-pole unmodulated fractional-slot winding, 1–2–3–2–1–1–2–3–2–1, as in the embodiment of FIG. 26 described later herein.

For three phase-winding of the form of FIG. 10(a), the unmodulated condition may be provided by the parallel star connection of FIG. 12(a) the modulated condition of FIG. 10(b) is then provided by the series star connection.

Again, alternative parallel-star and series delta connections may be used instead, see FIGS. 12(a) and 12(b).

Again, series unmodulated and parallel modulated connections may be used by phase reversal of the coils between terminals 11 and 12, corresponding to the modification shown in FIGS. 8(a) and 8(b). See also the examples of FIG. 23 and FIG. 25, described later herein.

Attention may with advantage be directed to a number of facts regarding the pole-amplitude modulation arrangements of FIGS. 1 through 4.

The poles are numbered from an arbitrary origin. Terminal 17 is the origin chosen throughout for consistency.

If the poles are reversed in polarity throughout the phase-winding, "N" for "S" and "S" for "N," the waveforms in every case remain effectively unchanged.

The modulation wave is applied positive half-cycle first. This is immaterial, so long as it is applied similarly to all three phase-windings but for consistent definition herein the modulation wave is always defined as having its origin immediately preceding the positive-going half-cycle.

The modulation wave origin coincides with the phase-winding origin at terminal 17 and pole 1. It is immaterial in any one phase-winding where the modulation wave begins. However, it is the spacing of the three modulation waves applied to the three phase-windings which determines whether the higher or the lower of the two modulated pole-numbers is eliminated in the 3-phase field.

Where mention is made herein of relative spacing of the three phase-winding for eliminating the unwanted pole number, it must be understood that if the modulation wave origins do not coincide with the phase-winding origins, the required relative spacing must then be defined in terms of the three modulation waves, not the phase-windings.

In the examples chosen, the unmodulated pole-number is always 8-poles. The modulation wave is always one complete cycle and the two modulated pole-numbers are 6-poles and 10-poles.

Certain generalisations can be made. A modulation wave of one complete cycle always produces two modulated pole-numbers differing from the original, unmodulated, pole-number by one pole-pair, two complete cycles by two pole-pairs and so on.

For example, if the waveform of FIG. 1(a) were produced in a half-revolution of the phase-winding and repeated in the second half-revolution, the unmodulated pole number would be 16-poles. If the modulation wave of FIG. 1(b) remained unchanged at one complete cycle, the two modulated pole-numbers would be 14-poles and 18-poles.

If the waveform of FIG. 1(a) and the modulation wave of FIG. 1(b) were both repeated, the unmodulated pole number would be 16-poles and the two modulated pole-numbers 12-poles and 20-poles.

If the modulation waveform of FIG. 1(b) were repeated for two complete cycles but not the waveform of FIG. 1(a), the unmodulated pole-number would remain 8-poles but the two modulated pole-numbers would be 4-poles and 12-poles.

If a modulation wave of more than one complete cycle is applied to each of three phase-windings, the first cycle thereof is not distinguishable in any physical way from the subsequent cycles, except in its relation to the phase-winding origin. Since this relationship is abritrary, as has been explained, in cases of multiple-cycle modulation waves, the required relative spacing for unwanted pole-number elimination may be considered from the origin of any one of the modulation cycles.

In summary, therefore, the first step of the pole-changing method of this invention may be defined by the following rule:

Take a known phase-winding providing P pole pairs. If a pole-amplitude modulation wave is applied to that phase-winding, two new pole-numbers are created in the resultant M.M.F. waveform. One new pole-number is (P−M) pole pairs and the other is (P+M) pole pairs, where M is the number of complete cycles of the modulation wave.

Elimination of unwanted modulated pole-number

It has now been explained how two new pole-numbers may be created in a phase-winding by applying any one of a number of different modulation waves. Early in this specification it was stated that either new pole-number could be eliminated in the 3-phase field, developed by the three phase-windings together, by providing certain relative spacing between the three phase-windings. Later, after the nature of the modulation waves had been explained, it was added that the required relative phase-winding spacing more generally defined in relation to the three modulation waves applied to the three phase-windings. The required relative spacing will now be explained more fully.

The function of a 3-phase winding is to provide a rotating 3-phase magnetic field when energised from a 3-phase supply. This requires that the phase-windings are relatively spaced by 120° electrically. The phase-sequence may be A, B, C, or A, C, B. Since there are two senses of rotation around the axis of a winding, phase-sequence must be defined in relation to one sense of rotation, say clockwise. In this reference sense of rotation, the phase-sequence A, B, C corresponds to the phase-band sequence +A, −C, +B, −A, +C, −B; the phase-band sequence A, C, B corresponds to the phase-band sequence +A, −B, +C, −A, +B, −C. These facts apply to every 3-phase rotary machine and as such are well-known theory.

A 3-phase winding according to the present invention has the phase-windings spaced electrically in accordance with the above-mentioned facts. The spacing required for elimination of the unwanted pole-number is mechanical spacing around the winding axis.

It is a requirement for a 3-phase winding according to the invention that the three modulation waves applied to the phase-windings are relatively spaced by 120° mechanical around the winding axis.

The relative spacing can be measured from corresponding points on all three modulation waves but it is most clearly measured from the three origins, which are defined as preceding the positive-going half-cycle of the relevant wave.

Since 120° mechanical is one-third of a revolution around the winding axis, it will be evident that this spacing requirement can be satisfied with either the phase sequence A, B, C, considered in the reference sense of rotation, or with the phase sequence A, C, B.

It is the choice between these two phase sequences which determines whether the higher or the lower modulated pole-number is eliminated in the 3-phase field.

This complete spacing requirement of a 3-phase winding according to the invention is defined by the following rule:

If one arbitrary sense of rotation be taken for reference, say clockwise, if the electrical phase-sequence in this sense is A, B, C, corresponding to the phase-band sequence +A, −C, +B, −A, +C, −B, and if the three modulating waves are applied to the three phase-windings all in this reference sense, with positive half-cycle first, then in order to eliminate either modulated pole-number from the 3-phase field, corresponding points of the modulation waves of the three phase-windings, say their origins, must be relatively spaced 120° mechanical around the winding axis.

This requirement satisfied, then the lower pole-number is eliminated to leave the higher pole-number if the modulation waves at the said 120° spaced points relate to the phases A, B, C in sequence, in the reference sense of rotation. The higher pole-number is eliminated to leave the lower pole-number if the modulation waves at the 120° spaced points relate to the phases A, C, B in sequence, in the reference sense of rotation.

A particularly simple and valuable form of the invention results when the eliminated pole-number is a multiple of three pole-pairs. This aspect of the invention is discussed more fully in the next section.

Pole-numbers which are a multiple of three pole-pairs

It has now been explained how a phase-winding operating with an unmodulated pole-number of P pole pairs is pole amplitude modulated to provide two modulated pole number (P+M) and (P−M) pole pairs, where M is the number of modulating cycles, and either modulated pole number can be elimniated by spacing and choice of phase sequence.

Pole-numbers which are a multiple of three pole-pairs have a special significance in the practical choice of the alternative working pole-numbers for a 3-phase winding according to the invention.

It will further be apparent that for any pole-number combination (P), (P+M) and (P−M), one pole-number out of these three pole-numbers must always be three pole-pairs or a multiple of three pole-pairs.

Consideration of the location of coils of any one phase-winding of a 3-phase, integral slot winding for an unmodulated pole-number which is a multiple of three pole-pairs, that is of the form $(3n)$ pole-pairs, will show that any three points spaced by 120° around the winding axis always lie on one same phase-winding. In such a case, it is obvious that the spacing rule defined above cannot be stated in terms of the three phase-windings themselves but only in its generally true form, in terms of the three modulation waves relating to the three phase-windings.

The positioning of a modulation wave at points around the periphery of a 3-phase winding not occupied by coils of the relevant phase-winding requires a special winding technique to be described later.

Furthermore, it will be evident that with a 3-phase winding for an unmodulated pole-number of the form $(3n+1)$ pole pairs, the 120° mechanical spacing of the three actual phase-windings can be satisfied only for the phase-sequence A, B, C. Equally, with a winding for an unmodulated pole-number of the form $(3n-1)$ pole pairs, the 120° mechanical spacing of the three actual phase-windings can be satisfied only for the phase-sequence A, C, B.

Both of the permissible cases given in the preceding paragraph corresponds to the elimination of a modulated pole-number which is three pole-pairs, or a multiple thereof.

Figure 13A:
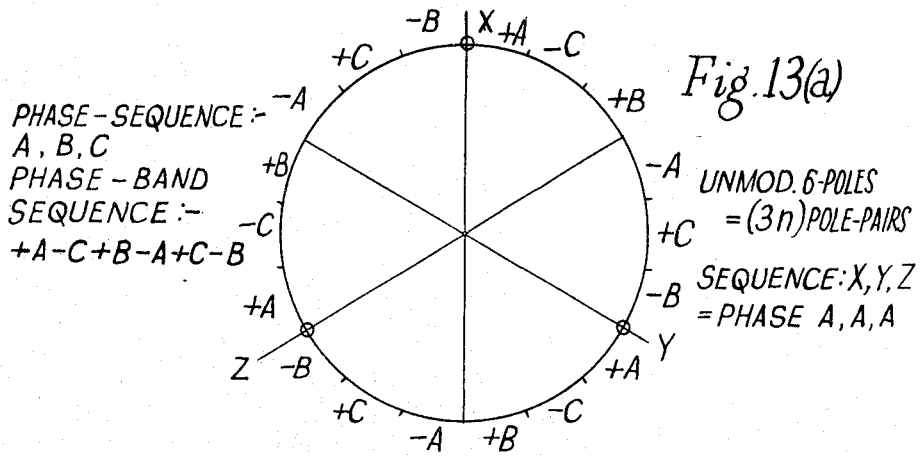
Figure 13B:
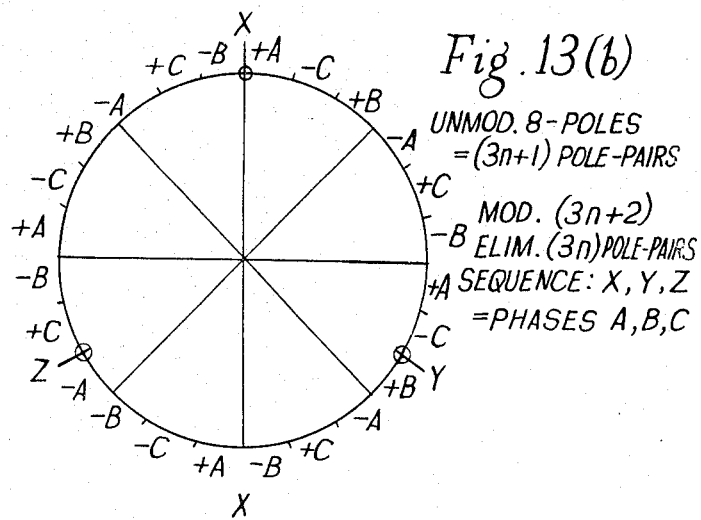
Figure 13C:
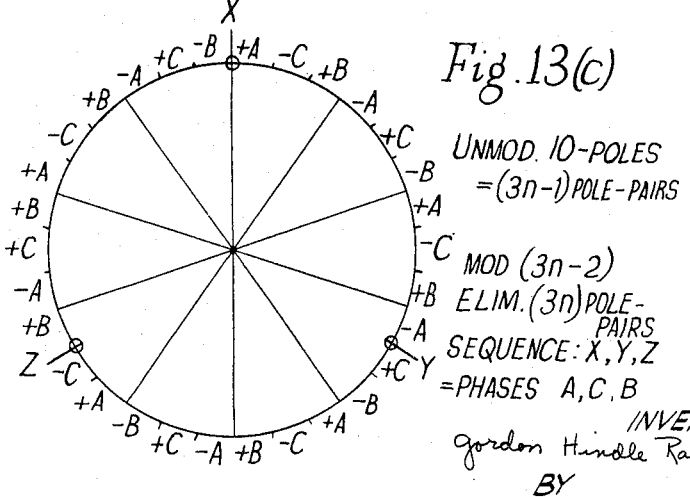

This can be seen pictorially from the clock diagrams of FIGS. 13(a), 13(b) and 13(c). These diagrams may be regarded each as a section through a 3-phase winding in a plane perpendicular to the axis. The circumference of the circle of each diagram represents the circumference of the 3-phase winding. The phase-bands, comprising conductors extending through the plane of the diagrams, are marked in each case. For all the diagrams, the electrical phase-sequence is A, B, C. Hence, as shown, the phase-band sequence is +A, −C, +B, −A, +C, −B.

Three chosen points, relatively spaced at 120° around the winding axis, are shown at X, Y and Z in each diagram.

FIG. 13(a) shows a 3-phase winding providing 6-poles unmodulated and is typical of windings for unmodulated pole-numbers of the form $(3n)$ pole-pairs.

The sequence of the phases appearing at points X, Y and Z is A, A, A.

FIG. 13(b) shows a 3-phase winding for 8-poles unmodulated and is typical of the form $(3n+1)$ pole-pairs. The two modulated pole-numbers created are $(3n)$ and $(3n+2)$ pole pairs. The phase-sequence at points X, Y and Z is A, B, C. Hence the pole-number $(3n)$ is eliminated and the pole-number $(3n+2)$ remains.

FIG. 13(c) shows a 3-phase winding for 10-poles unmodulated and is typical of the form $(3n-1)$ pole-pairs. The two modulated pole-numbers created $(3n-2)$ and $(3n)$ pole-pairs. The phase-sequence at points X, Y and Z is A, C, B. Hence the pole-number $(3n-2)$ remains and the pole-number $(3n)$ is eliminated.

The foregoing can be generalised as a further rule defining the invention as follows:

Provided that neither the original (unmodulated) pole-number nor the modulated pole-number which remains is three pole-pairs or a multiple thereof, exactly the same modulation means can be applied to each one of the three phase-windings.

That is to say, if coil arrangement and alternative connections of FIGS. 5(a) and 5(b) are chosen for phase-winding A, exactly the same coil arrangement and connections are used for phase-windings B and C. Similarly, any other of the many means of modulation used for phase-winding A is used identically for phase-windings B and C.

In such a case, all three phase-windings are physically identical. Each phase-winding is physically symmetrical about the origin of its modulating wave, which is the same as saying that each phase-winding is symmetrical about its own mid point.

For this reason, embodiments of the invention where neither of the alternative (operative) pole-numbers is three pole-pairs, or a multiple thereof, are referred to herein as examples of "symmetrical pole-amplitude modulation."

The phase-winding expedients to provide an (operative) pole-number which is three pole-pairs, or a multiple thereof, all have a selected one of the three phase-windings modulated by the method of symmetrical pole-amplitude modulation already explained herein. Phase-windings B and C are not symmetrical as is phase-winding A and, for this reason, embodiments of the invention where one of the alternative (operative) pole-numbers is three pole-pairs or a multiple thereof, are referred to herein as examples of "asymmetrical pole-amplitude modulation."

*Asymmetrical pole amplitude modulation*

In any 3-phase winding, for any unmodulated pole-number whatsoever, at least one phase-winding (phase A) can be modulated by the method of symmetrical pole-amplitude modulation. Provided that the eliminated modulated pole-number is of the form (3n) pole-pairs, both the other phase-windings B and C can be modulated identically.

Asymmetrical pole-amplitude modulation is a method for establishing a modulating wave at a required angular position around the axis of a 3-phase winding regardless of the physical position of the phase-bands to which it relates. The method employs the fact that if two cyclic waveforms of the same wavelength are combined, the zero points of the resultant cyclic waveform occur at points lying between the zero points of the component waveforms.

The method of asymmetrical pole amplitude modulation for phase-windings B and C comprises first modulating phase-winding A (symmetrically) to establish the positions of the three points X, Y and Z spaced 120° around the winding axis. The reference sense of rotation around the winding axis being known from the phase-band sequence of phase-winding A, the phase-sequence at the 120° spaced points X, Y and Z is next determined according to whether it is desired to eliminate the higher modulated pole-number or the lower, according to the rule given above. Consider first the point relating to phase B. No phase-band of phase B is located at this point. Both the nearest-located phase-bands of phase B are modified in amplitude so that the vector-resultant at the said point (X or Y) is substantially zero. This process defines the positions of two component modulation waves for phase-winding B which vectorially provide a resultant modulation wave at the correctly angular spacing relatively to the modulation wave of phase A. The same procedure is followed in respect of phase C.

The method will now be explained for a 6-pole, 3-phase winding in 54 slots, with reference to FIGS. 14(a) through 14(e).

At the head of the combined figures are shown the slot positions, every third slot number being given. At the position of slot 1 is shown a broken line X representing the origin of the modulation wave for the (symmetrically) modulated phase-winding A. The points Y and Z, relatively spaced from point X by 120° around the winding axis, thus are located at the positions of slot 19 and slot 37. These points Y, Z are also shown by broken lines. Point X is repeated at X'.

It is assumed, for the purpose of this example, that a single-cycle modulation wave is to be applied to all three phase-windings and that it is desired to retain the modulated pole-number of 8-poles while eliminating the modulated pole-number of 4-poles.

It follows therefrom that the phase-sequence at points X, Y and Z is A, B, C.

FIG. 14(a) shows the spatial positions of the 6 poles in the full revolution of phase-winding B. These are of alternating polarity and all of pole-ampiltude "PA." Phase-winding B is taken as having its origin at slot 7 and the electrical angular spacing 0 to $6\pi$ along the winding is shown on the horizontal axis of the figure.

The horizontal axes of the remaining FIGURES 14(b) through 14(e) show the corresponding mechanical angular spacing 0 to $2\pi$.

FIG. 14(b) shows, at b, the notional modulation wave for phase-winding B, having its origin at point Y, as determined by the phase-sequence A, B, C. In this example, the modulation wave b is of simple step-function having a positive half-cycle of amplitude "M" followed by a negative half-cycle of the same amplitude.

The curve b' shows an idealised modulation wave of sinusoidal form which occupies the same spatial position as wave b, its origin occurring at point Y.

FIGS. 14(c) and 14(d) show two component modulation waves having their origins spaced apart $\pi/3$ mechanically that is by one pole pitch, both of the same form as wave b of FIG. 14(b) but of smaller amplitude. That of FIG. 14(c) is of amplitude $\frac{2}{3}M$ and has its origin located $\pi/9$ radians mechanical ahead of point Y. That of FIG. 14(d) is of amplitude $\frac{1}{3}M$ and has its origin $2\pi/9$ radians mechanical after point Y.

It will be noted that the component modulation waves of FIG. 14(c) and FIG. 14(d) are now coincident with the phase-bands of phase-winding B.

FIG. 14(e) represents the vector resultant of the two component modulation waves. The sinusoidal wave b' is shown again for reference. It will be seen that the resultant modulation wave is of a stepped form which corresponds more nearly to the sinusoidal form of curve b' than does the wave b of FIG. 14(b) and while its zero points do not exactly coincide with point Y and a point at slot 46 spaced $\pi$ radians from point Y, nevertheless a mean curve drawn through the stepped wave coincides with the curve b' very closely.

Since the component modulation waves coincide with the relevant phase-bands, so also does the resultant modulation wave of FIG. 14(e).

Figure 1:
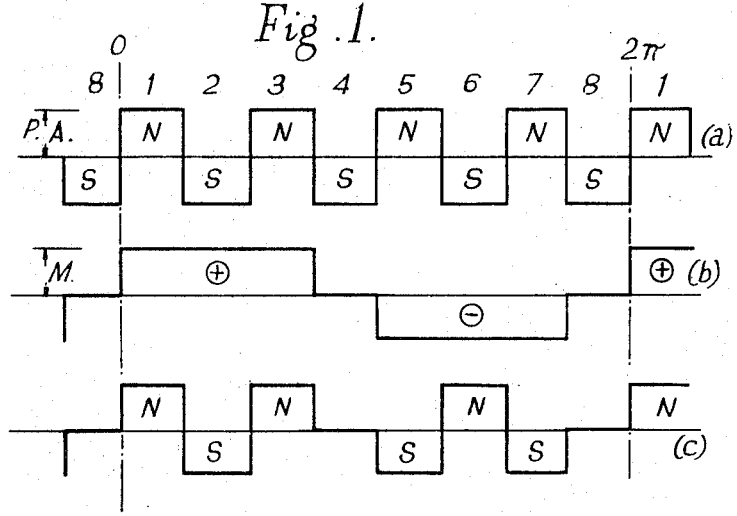
Figure 2:
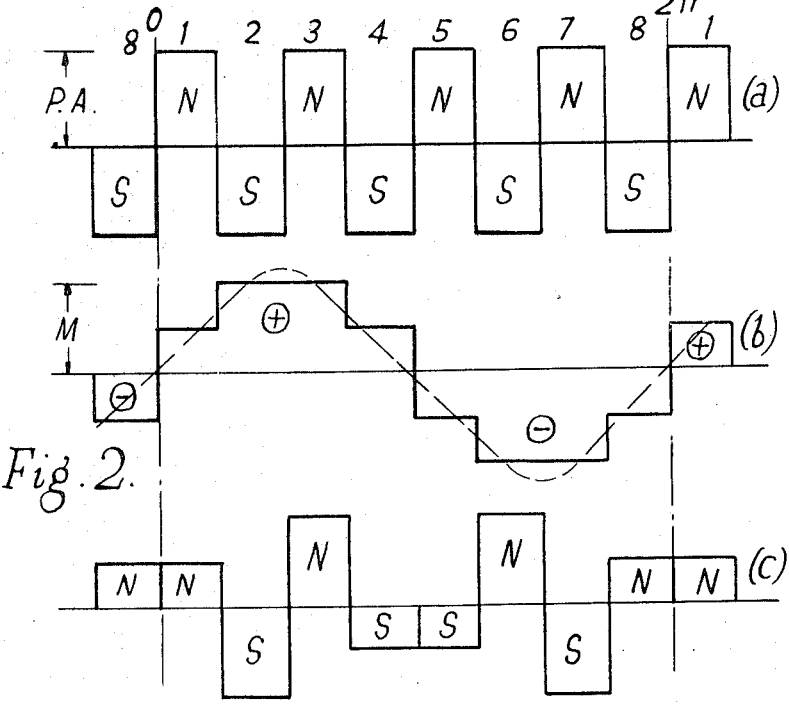
Figure 4:
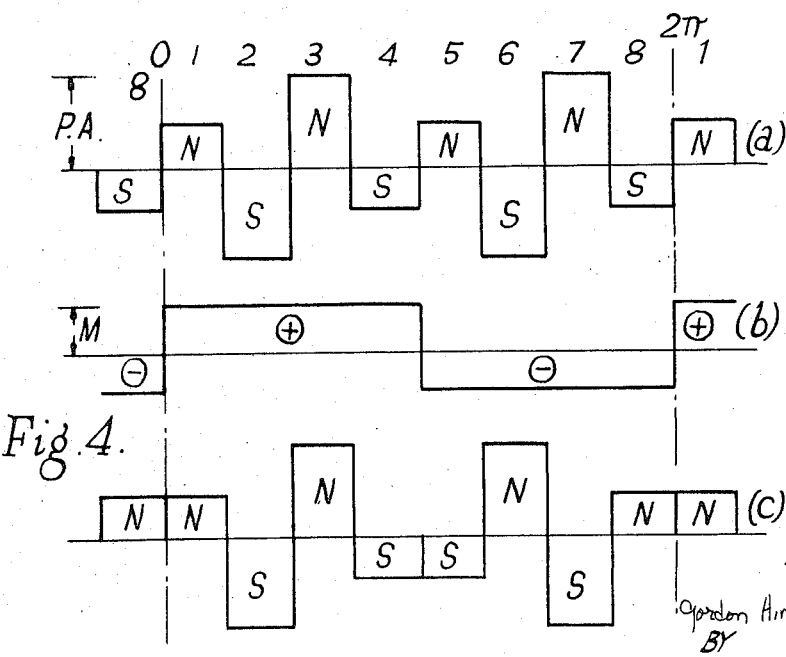

The modulation wave is applied to the phase-winding in similar manner to the modulation waves described in FIGS. 2 and 3. The phase-bands under the positive portion of amplitude "M" remain unchanged. The phase-bands under the negative portion of amplitude "M" are reversed in circuit. The phase-bands under the portions of amplitude $\frac{1}{3}M$ are reduced in pole-amplitude to one-third, the sense of current flow therein being determined by the sign of the modulation wave half-cycle concerned.

It will be evident from the comparative examples of FIG. 6(b) and FIG. 7(b) that the required pole-amplitude reduction, in the phase-bands for poles 2 and 5 where this is required, may be effected by coil omission or by coil opposition in the modulated connection o fthe phase-winding, as preferred.

Since two poles are reduced to one-third amplitude in the modulated condition, it is convenient to represent the phase-winding in this example as one wound with three slots pole pole per phase. In the unmodulated connection, the winding is represented:

+3, +3, +3,    +3, +3, +3

If pole-amplitude reduction is effected by coil omission, the phase-winding in the modulated connection is represented:

0.0+1, +3, +3,    0.0−1, −3, −3

If pole-amplitude reduction is effected by coil opposition, the phase-winding in the modulated connection is represented:

−1, +2, +3, +3,    +1, −2, −3, −3

Figure 14:
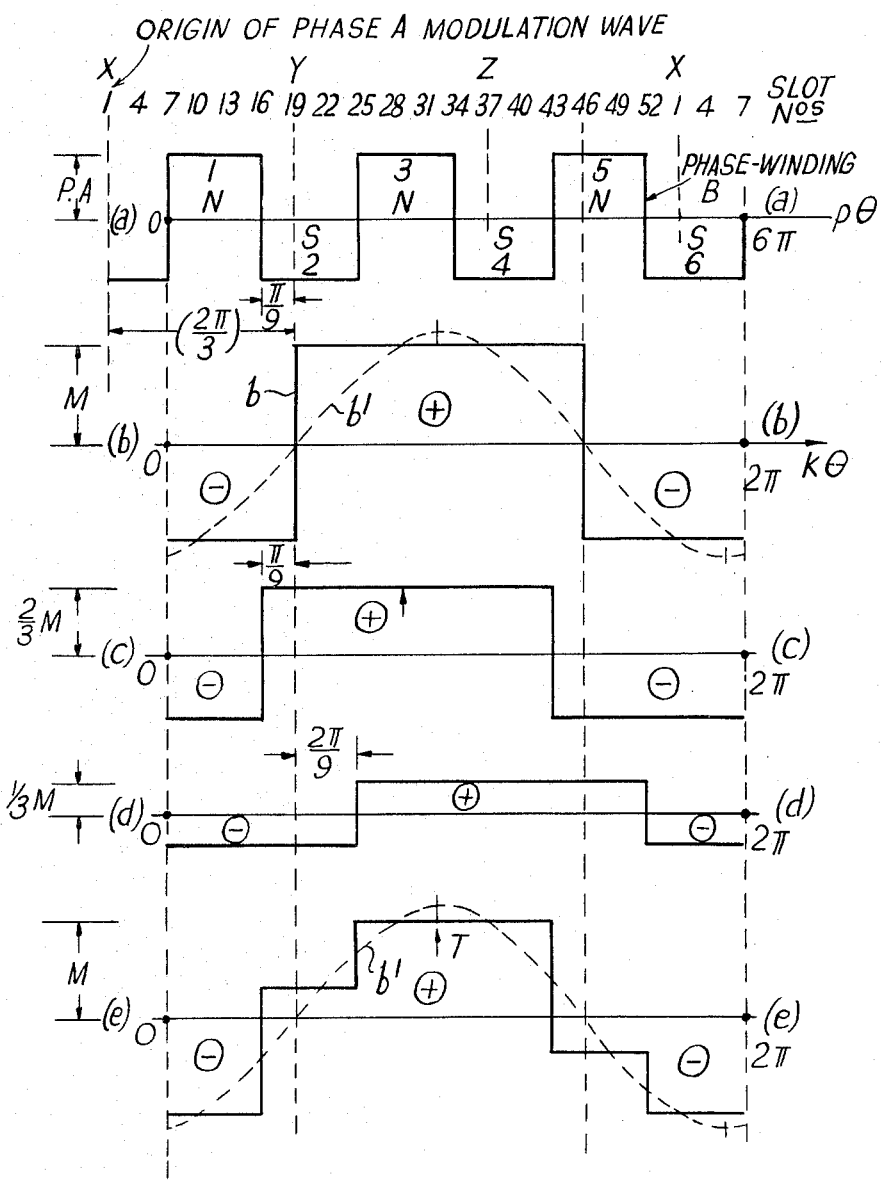
FIG. 14 shows a different form of pole amplitude modulation from that of FIGS. 1 through 4.

If modulation is effected by coil reversal and coil omission, the circuits of FIG. 11(a) and FIG. 11(b) are used. In the example of FIG. 14, one coil of pole 2 and all coils of poles 3 and 4 are serially connected between terminals 17 and 14. One coil of pole 5 and all coils of poles 6 and 1 are serially connected between terminals 14 and 13. The remaining two coils each of poles 2 and 5 are connected in a branch between terminals 14 and 19.

Either these branch-connected coils are wound with half the number of turns of double-gauge conductors or they are connected as a series-parallel combination.

If modulation is effected by coil reversal and coil opposition, the circuits of FIG. 12(a) and 12(b), or the series-star equivalent, are used. In the example of FIG. 14, two coils of pole 2, all coils of poles 3 and 4 and one coil of pole 5 are serially connected between terminals 17 and 14. Two coils of pole 5, all coils of poles 6 and 1 and one coil of pole 2 are serially connected between terminals 14 and 13.

In the case either of coil omission or coil opposition, phase-winding C is asymmetrically pole-amplitude modulated in similar manner to phase-winding B. Phase-windings B and C therefore provide balanced electromagnetic fields.

In considering the symmetrical pole-amplitude modulation of phase-winding A, it is necessary to provide for a balanced 3-phase electromagnetic field for the 3-phase winding as a whole.

This requirement necessitates the reduction of pole amplitudes of phase-winding A in the modulated connection, to balance phase-windings B and C. This in turn suggests one of the sinusoidal modulation patterns, of the form of FIGS. 2(b) and 3(b).

If coil omission is used in phase-windings B and C, coil omission is also used in phase-winding A, the omitted coils being branch-connected between terminals 12 and 18. Thus FIGS. 11(a) and 11(b) are correct for all three phase-windings.

If coil opposition is used in phase-windings B and C, coil opposition is also used phase-winding A, the reversed coils being connected with the remainder of the reversed coils between terminals 12 and 11. Thus FIGS. 12(a) and 12(b) correctly illustrate all three phase-windings.

The asymmetrically modulated windings described so far are integral slot windings.

It is also possible to provide a fractional slot 3-phase winding using asymmetrical modulation, phase-winding A having a symmetrical coil distribution of a form such as is shown in FIG. 4(a) and FIGS. 10(a), 10(b) and phase-windings B and C, having a compatible but asymmetrical coil distribution.

An example of such fractional slot windings will be given for the case where the unmodulated pole-number is not three pole-pairs, or a multiple, but the modulated pole-number is.

Figure 15:
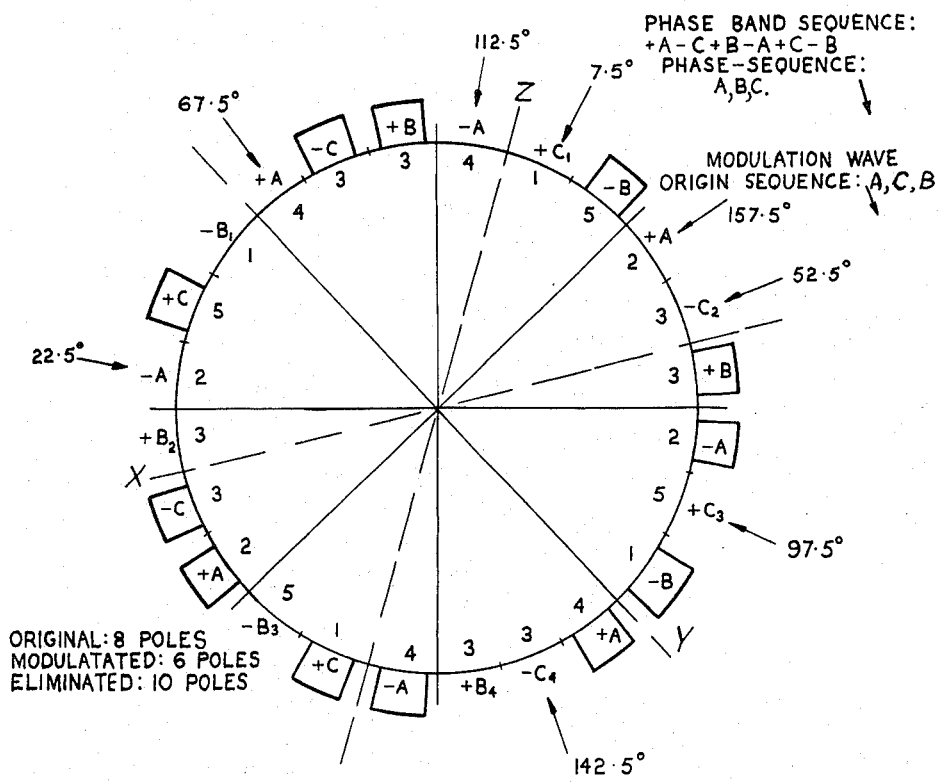
FIG. 15 is a diagram showing a 3-phase winding with pole-changing using the form of pole amplitude modulation of FIG. 14.

The first example is an 8-pole fractional slot winding wound in 72 slots represented in the clock diagram of FIG. 15. In the clockwise sense, the phase-sequence is A, B, C and hence the phase-band sequence is +A, −C, +B, −A, +C, −B, as shown. The phase sequence at the 120° spaced points X, Y and Z is A, C, B, resulting in the elimination of the modulated pole-number of 10-poles, the modulated pole-number of 6-poles remaining.

The three phase-windings are represented as follows:

Phase-winding A, unmodulated:

+2, +4, +4, +2,    +2, +4, +4, +2

Phase-winding A, modulated:

+2, +4, +4, +2,    −2, −4, −4, −2

Phase-winding B, unmodulated:

+1, +3, +5, +3,    +1, +3, +5, +3

Phase-winding B, modulated:

+1, +3, +5, +3,    −1, −3, −5, −3

Phase-winding C, unmodulated:

+3, +5, +3, +1,    +3, +5, +3, +1

Phase-winding C, modulated:

+3, +5, +3, +1,    −3, −5, −3, −1

Thus it will be seen that only reversal of one-half of each phase-winding relatively to the other half is required for modulation. The alternative parallel-star and series-star connections of FIGS. 12(a) and 12(b) may be used, therefore. However, it is preferred to use the corresponding parallel-star and series-delta alternative connections.

TABLE A

It will now be evident that the alternatives of symmetrical pole-amplitude modulation and asymmetrical pole-amplitude modulation make the method of pole-changing according to the invention universally applicable. In general, any particular pole-number alternatives may be provided by taking a winding giving the lower pole-number and obtaining the higher pole-number by modulation or by taking a winding giving the higher pole-number and obtaining the lower pole-number by modulation.

Some possibilities of selection and the form of modulation needed are set out in Table A appended. The table is drawn for examples of single-cycle modulation waves. The pole-number "2" is omitted from the table, although it is obtainable, because it does not provide an embodiment of the invention.

*Sense of rotation*

It is well-known that the design of a 3-phase machine is unaffected by the sense of rotor rotation required, because the rotation can always be reversed by interchanging any two of the three phase-winding connections to the 3-phase supply.

Furthermore, a two-speed machine is not necessarily required to have the same sense of rotation at both speeds.

Induction motors using a 3-phase winding according to the invention normally rotate in opposite sense at the alternative speeds.

FIG. 16(a) shows the actual switching connections giving the alternative phase-winding connections of FIGS. 11(a) and 11(b). The connections of FIG. 16(b) reverse the connections of lines $L_2$ and $L_3$ to phase-windings B and C in the series star connection.

In the FIGS. 16(a), 16(b), the switching connections are as follows:

Parallel star: Close A and C; open B
Series star: Close B; open A and C

In each of FIGS. 16(a), 16(b), the 3-phase winding is shown, by way of example, as forming the stator winding of a squirrel-cage induction motor. The squirrel-cage rotor is shown at 30 in each figure.

Synchronous machines

A pole-changing 3-phase winding according to the invention may equally well be used in a synchronous motor or generator. Electrically, the 3-phase winding may form either the stator winding or the rotor winding of such a machine, but the physical construction and switching connections are much simplified if the 3-phase winding is the stator winding and the rotor winding is the field winding.

A suitable pole-changing field winding, to be combined with a 3-phase winding according to the invention, is either the known "phantom pole" or "blinde pole" field winding or the novel pole-changing field winding described herein.

Windings of both forms, D.C. energised to provide 10-poles and 8-poles alternatively, by way of example, will now be considered by way of comparison.

FIG. 17(a) shows the M.M.F. waveform of either form of field winding connected to provide 10 poles. Physically, the winding comprises 10 coils serially connected between the terminals of a D.C. source. The coils provide poles of alternate polarity and all of the same amplitude $h$. The coils will be referred to by the number of the pole produced thereby as shown in FIG. 17(a).

To provide 8-poles, the known field winding is reconnected so that coils 5 and 10 are omitted from circuit and coils 6 through 9 are reversed in circuit. The resultant M.M.F. waveform is shown in FIG. 17(b).

The 8-pole waveform of FIG. 17(b) has a large 4-pole sub-harmonic, which can be shown to have an amplitude of about one-quarter that of the 8-pole fundamental. In practice this sub-harmonic is undesirable because it exerts a bending effect upon the frame of the machine.

A preferred waveform is that shown in FIG. 17(c) which is the corresponding 8-pole M.M.F. waveform.

In the waveform of FIG. 17(c), all poles 1 through 5 remain of the same polarity as in FIG. 17(a). All poles 6 through 10 are reversed in polarity. Additionally, poles 1, 5, 6 and 10 are reduced in amplitude. These last-mentioned poles are not shown to scale in FIG. 17(c). The reduced amplitude, shown as $ah$, is preferably about one-quarter the amplitude $h$ or, in this example of 10/8-poles, more exactly 23.6% of the amplitude $h$. The percentage figure is obtained in any case from examination of the equation of the waveform of reduced pole-number. The percentage figure chosen is that which provides maximum relative amplitude at the reduced pole-number.

Alternative physical arrangements of pole-changing field windings and the alternative switching connections to provide a 10-pole field corresponding to FIG. 17(a) and an 8-pole field corresponding to FIG. 17(c) are shown in FIGS. 20 through 24, wherein corresponding elements are indicated by the same reference numerals. In each figure, the D.C. winding is assumed to be the rotor winding of the machine and connections from the winding are brought out to the required number of sliprings. The sliprings are shown on the right hand side of each figure and both the alternative connections are shown in each figure, the 10-pole connections being shown above the sliprings at (A) and the 8-pole connections below at (B).

Figure 18:
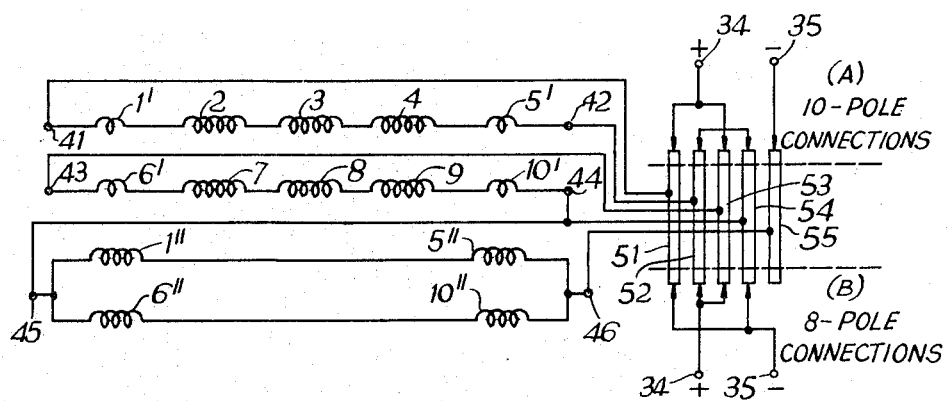

In FIG. 18, a 10-pole D.C. winding comprises ten coils 1 to 10 arranged as two half-windings respectively comprising coils 1 to 5 and coils 6 to 10. The coils 1, 5, 6 and 10, the coils at the ends of the two half-windings, are each wound in two parts, the smaller parts 1', 5', 6' and 10' each comprising one quarter of the full coil turns and the larger parts 1", 5", 6" and 10" each comprising the remaining three-quarters of the turns. The coils 1', 2, 3, 4 and 5' are connected in series between terminals 41 and 42 and the coils 6', 7, 8, 9 and 10' are connected in series between terminals 43 and 44. The coils 1" and 5" are connected in series with each other and the coils 6" and 10" are connected in series with each other, the two series combinations being connected in parallel between terminals 44 and 45. Terminal 41 is connected to a first slipring 51, terminal 42 to a second slipring 52 and terminal 43 to a third slipring 53. Terminals 44 and 45 are connected together and to a fourth slipring 54. Terminal 46 is connected to a fifth slipring 55.

For each mode of connection, in all of the FIGS. 18 through 21, the D.C. winding is supplied with current from a current source having its positive pole at terminal 34 and its negative pole at terminal 35.

For the 10-pole connection of FIG. 18, sliprings 52 and 54 are connected together, sliprings 51 and 53 are connected together and to terminal 34 and slipring 55 is connected to terminal 35. All the coil parts are thus energised. For the 8-pole connection, sliprings 52 and 53 are connected together and to terminal 34, sliprings 51 and 54 are connected together and to terminal 35. Slipring 55 is isolated. Thus the coil parts 1", 5", 6" and 10" are not energised and the corresponding poles reduced to one-quarter amplitude.

Figure 19:
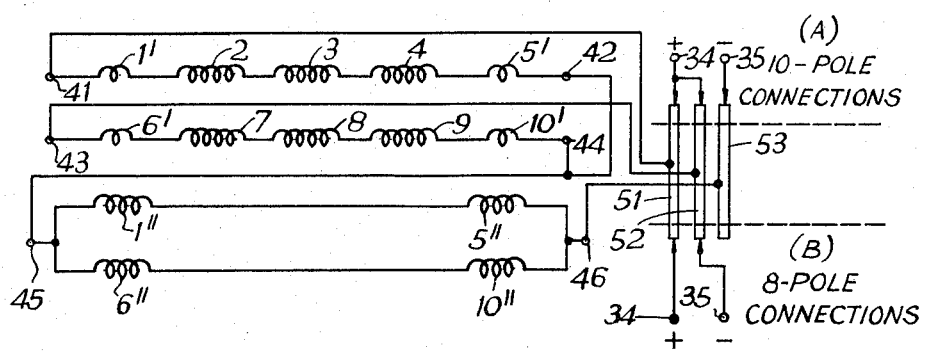

In FIG. 19, the arrangement of the coils 1 to 10 and their connections to terminals 41 to 46 are the same as in FIG. 18. Similarly, the coil parts 1', 5', 6' and 10' each contain one quarter of the full turns of the respective coils and the coil parts 1", 5", 6" and 10" each contain three quarters of the turns. In the arrangement of FIG. 19, however, only three sliprings are required, the terminals 42, 44 and 45 being connected together permanently without a connection to a slipring. Terminal 41 is connected to slipring 51, terminal 43 is connected to slipring 52 and terminal 46 is connected to slipring 53. For the 10-pole connection, sliprings 41 and 42 are connected together and to terminal 34. Terminal 35 is connected to slipring 53. For the 8-pole connection, terminal 34 is connected solely to slipring 51 and slipring 52 is connected to terminal 35. Slipring 53 is isolated. Again, the coil parts 1", 5", 6" and 10" are isolated.

Figure 20:
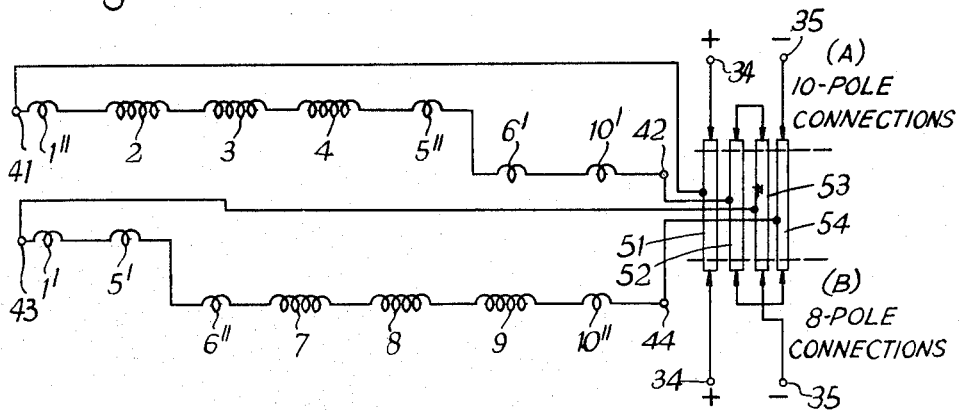
Figure 21:
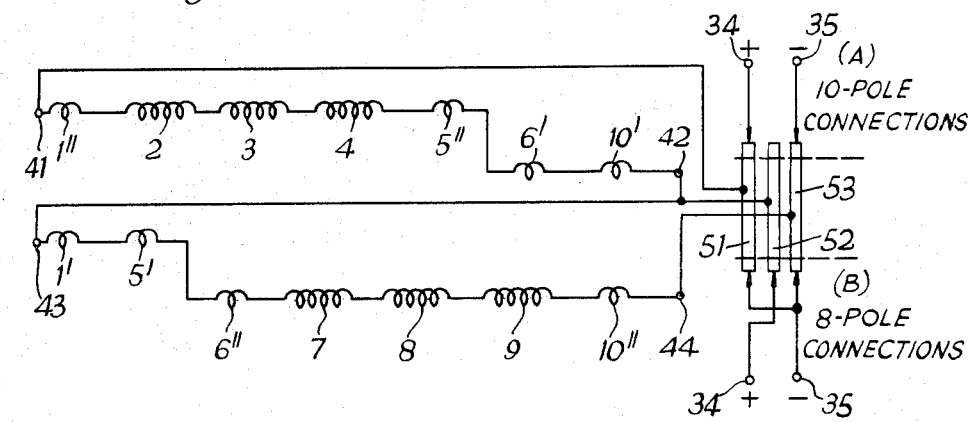

FIGS. 20 and 21 show an alternative construction of pole-changing field winding in which the M.M.F. distribution of FIG. 17(c) is obtained by coil opposition. As in the arrangements of FIGS. 18 and 19, the coils 2, 3, 4, 7, 8 and 9 each contain the full number of turns. The coils 1, 5, 6 and 10, the coils at the ends of the two half windings, each comprise two parts. The small parts 1', 5', 6' and 10' each contain three-eighths of the total turns of the winding and the larger parts 1", 5", 6" and 10" each contain the remaining five-eighths of the total turns.

In the arrangement of the coils shown in FIG. 20, the full coils 2, 3 and 4 together with the coil parts 1", 5", 6' and 10' are all connected in series between terminals 41 and 42. The full coils 7, 8 and 9 together with the coil parts 1', 5', 6" and 10" are all connected in series between terminals 43 and 44. Terminal 41 is connected to a slipring 51, terminal 42 to a slipring 52, terminal 43 to a slipring 53 and terminal 44 to a slipring 54. In the 10-pole connection, sliprings 52 and 53 are connected together, terminal 34 is connected to slipring 51 and terminal 35 is connected to slipring 54. In the 8-pole connection, sliprings 52 and 54 are connected together, terminal 34 is connected as before, to slipring 51 and terminal 35 is connected to slipring 53.

In the arrangement of FIG. 21, the coils or coil parts 1", 2, 3, 4, 5", 6' and 10' are similarly connected in series between terminals 41 and 42 and the coils or coil parts 1', 5', 6", 7, 8, 9 and 10" are similarly connected in series between terminals 43 and 44. Terminal 41 is connected to slipring 51, terminals 42 and 43 are connected together and to slipring 52. Terminal 44 is connected to slipring 53. For the 10-pole connection, terminal 34 is connected to slipring 51 and terminal 35 is connected to a slipring 53. Slipring 52 is isolated. For the 8-pole connection, terminal 34 is connected to slipring 52. Sliprings 51 and 53 are connected together and to terminal 35.

In the 8-pole connections (B) of FIGS. 20 and 21, the three-eighths turns of the smaller parts of the divided coils 1, 5, 6 and 10 are flux-opposed to the five-eighths turns of the larger parts thereof. The flux resultant gives an amplitude for the corresponding poles of substantially one-quarter their amplitude in the 10-pole connections (A) when the coil parts are connected in flux-aiding relationship.

*Practical machines*

A number of practical 3-phase machines using the pole-changing method of the invention will now be described with reference to the slot winding diagrams of FIGS. 22, 23, 24 and 25. All these machines will be described as induction motors, by way of example, having squirrel cage rotors, not shown in these figures.

Figure 22:
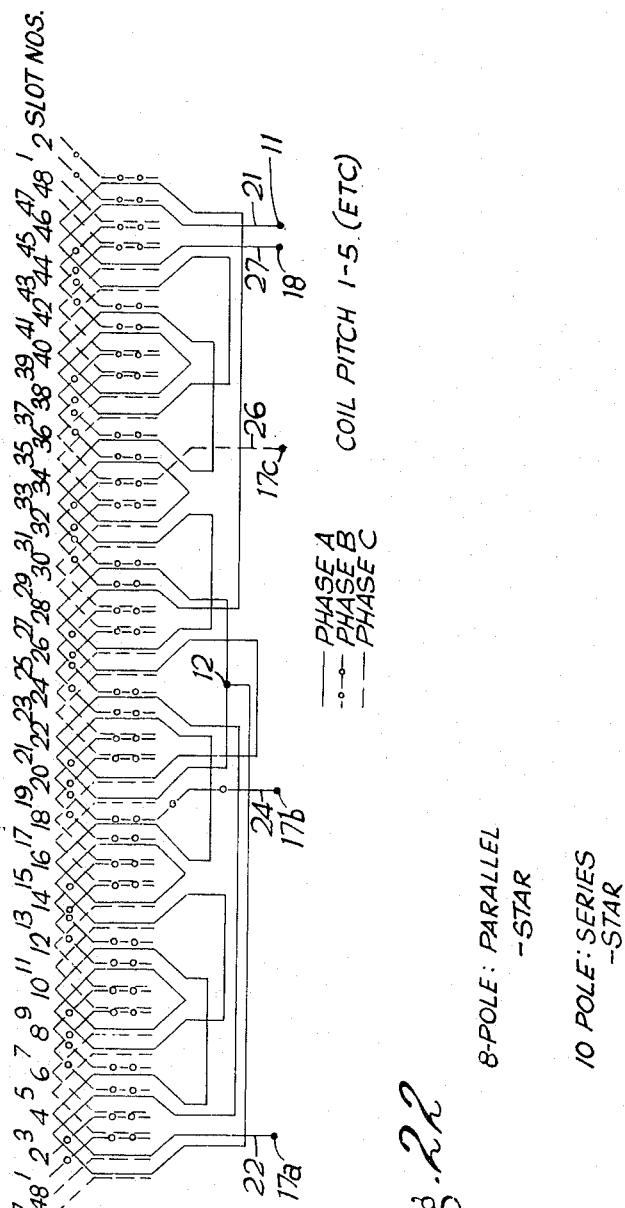

FIG. 22 is a slot winding diagram of a 3-phase, integral slot winding wound for 8-poles unmodulated in a 48-slot stator frame with 2 slots per pole per phase. The coil pitch is slot 1 to slot 5 and so on throughout, that is four slots or two-thirds full pole-pitch for 8 poles. Phase-winding A is shown completely in full lines starting at terminal 17a and ending at terminal 11. Phase-winding B and C conductors are shown in the diagram and are identified by the key given. Phase-windings B and C are spaced apart and from phase-winding A by sixteen slots, which corresponds to 120° relative angular spacing around the winding axis.

Each phase-winding provides the 8-pole M.M.F. distribution of FIG. 2(a) in the unmodulated connection and the mixed 6-pole, 10-pole waveform of FIG. 2(c) in the modulated connection. The coils of each phase-winding are arranged as in FIGS. 9(a) and 9(b) and the three phase-windings connected in parallel-star according to FIG. 11(a) for the unmodulated connection and in series-star according to FIG. 11(b) for the modulated connection.

The phase-sequence in the sense in which the stator slots are numbered is A, B, C, corresponding to the phase-band sequence +A, −C, +B, −A, +C, −B. The modulation wave sequence in the same sense is also A, B, C, so that the lower modulated pole-number of 6-poles is eliminated and the higher modulated pole-number of 10-poles remains, see FIG. 13(b).

As the eliminated pole-number is 3 pole-pairs, symmetrical pole amplitude modulation is used and all phase-windings are identical.

The unmodulated phase-windings are represented thus:

+2, +2, +2, +2,     +2, +2, +2, +2 and the modulated winding thus:

0.+1, +2, +2, +1.0,     0.−1, −2, −2, −1.0

The following practical data relates to this winding: Relative harmonic content of waveform in 10-pole connection:

2-pole, 7.5%; 10-pole, 100%; 14-pole, 9.2%; 22-pole, 5.4%; 26-pole, 9.3%.
8-pole winding factor: 0.838
10-pole winding factor: 0.582, calculated for all conductors, including conductors omitted. Flux density ratio 8-pole/10-pole: 1.11.

Figure 23:
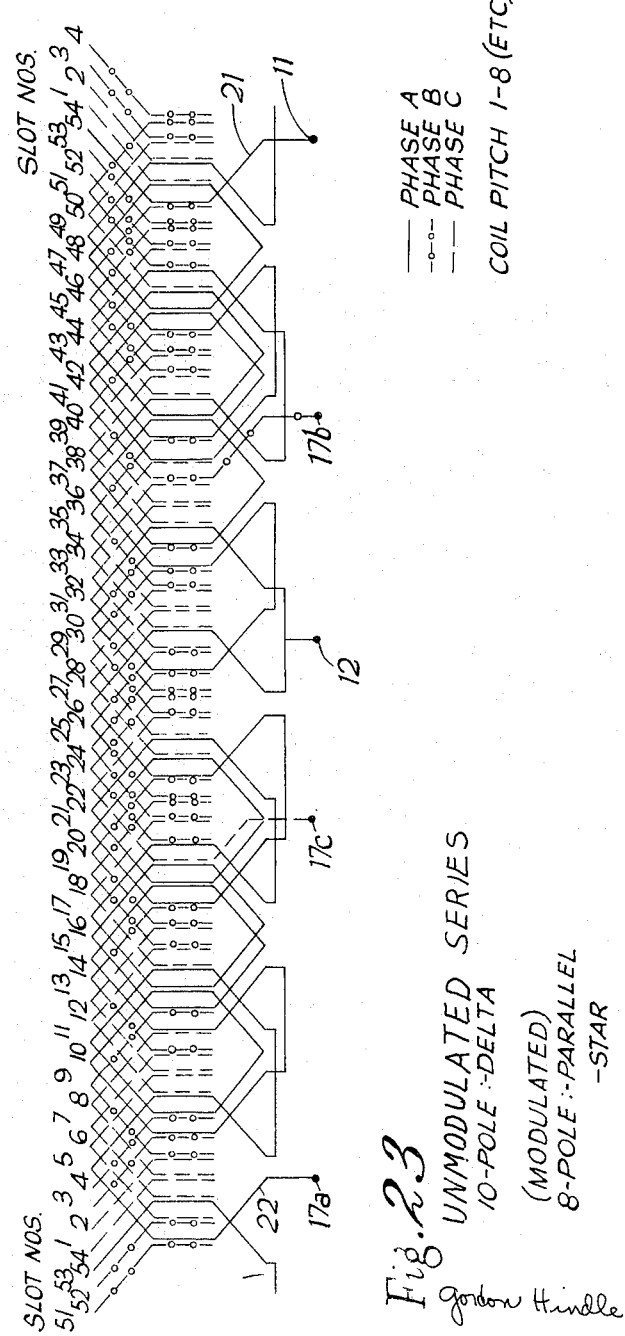

FIG. 23 shows a 3-phase, fractional slot winding wound for 10-poles unmodulated in a 54-slot stator frame. The coil pitch is slot 1 to slot 8 and so on throughout, that is 7 slots or 1.3 times full pole-pitch for 10-poles.

Phase-winding A is fully shown in full lines. The conductors of phase-windings B and C are shown and identified by the key given. The three phase-windings are relatively spaced by eighteen slots, corresponding to 120° angular spacing around the winding axis.

Each phase-winding provides a 10-pole M.M.F. distribution of cyclically varying amplitude, which is the 10-pole equivalent of the waveforms of FIG. 4(a), referred to earlier herein. A sinusoidal modulated pole-amplitude, similar to but not the same as FIG. 4(c), is therefore obtained solely by reversal of half each phase-winding. The waveform in the modulated connection is mixed 8-pole and 12-pole.

In this example, the three phase-windings are connected in series delta for the unmodulated 10-pole connection, terminals 11, 17b, terminals 13, 17c and terminals 15, 17a being joined together in pairs, as shown in FIG. 12(b). In modulated connection the three phase-windings are connected in parallel-star, as shown in FIG. 12(a).

The phase sequence in the sense in which the stator slots are numbered is A, B, C. The modulation wave sequence in the same sense is A, C, B so that the higher modulated pole-number of 12-poles is eliminated and the lower pole-number of 8-poles remains, see FIG. 13(c).

As the eliminated pole-number is a multiple of 3 pole-pairs, symmetrical pole-amplitude modulation is used and all phase-windings are identical.

The unmodulated phase-windings are represented thus:

+1, +2, +3, +2, +1     +1, +2, +3, +2, +1 and the modulated winding thus:

+1, +2, +3, +2, +1     −1, −2, −3, −2, −1

This machine provides a modulated 8-pole waveform of low harmonic content and a high winding factor, for both 10-poles and 8-poles.

Figure 24:
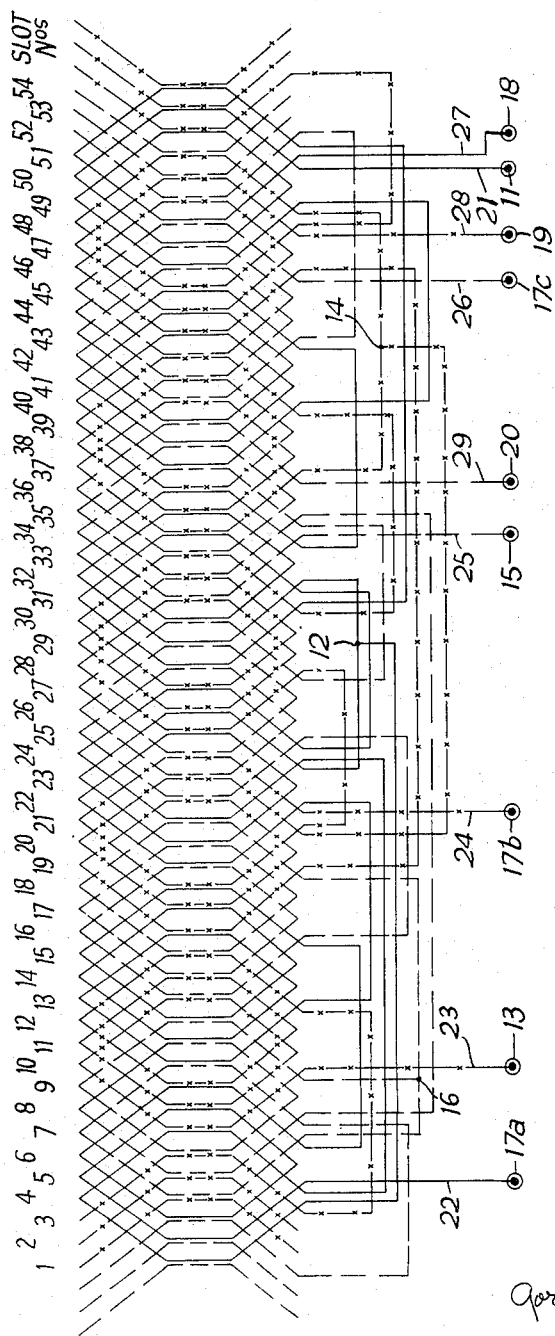
Figure 25:
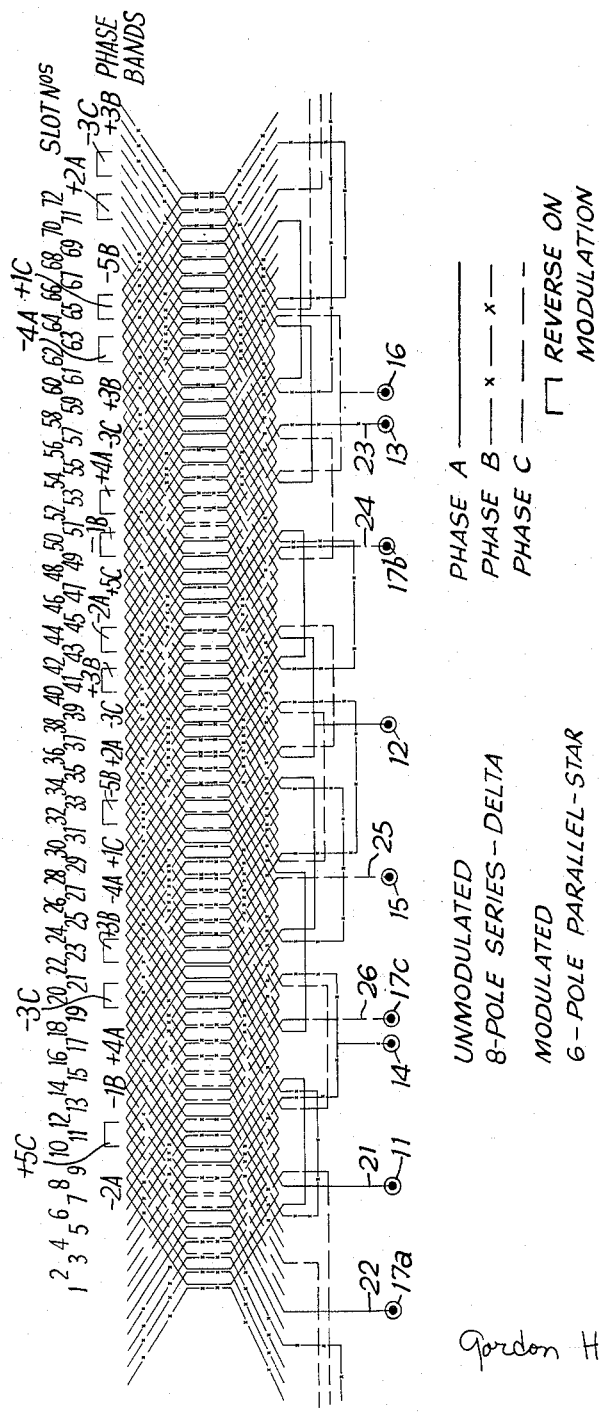

FIGS. 24 and 25 show examples of machines using asymmetrical pole-amplitude modulation.

FIG. 24 is the slot winding diagram of a 3-phase, integral slot winding wound for 6-poles unmodulated in a 54 slot stator, with 3 slots per pole per phase. The coil pitch is slot 1 to slot 7, an interval of 6 slots or two-thirds full pole-pitch at 6-poles.

The phase-sequence, in the sense in which the slots are numbered, is A, B, C corresponding to the phase-band sequence +A, −C, +B, −A, +C, −B, see FIG. 13(a).

Single-cycle modulation waves are applied to the phase-windings. Hence the modulated pole-numbers are 4-poles and 8-poles. Since the unmodulated pole-number is 3 pole-pairs, this 3-phase winding cannot be modulated by symmetrical pole-amplitude modulation to either 4-poles or 8-poles. Three points relatively spaced by 120° around the winding axis are exemplified by slots 1, 19 and 37. Coils of phase-winding A appear in all these slots, see FIG. 13(a). However, the modulation cycle sequence at these points is A, B, C. Hence the lower modulated pole-number of 4-poles is eliminated to leave the higher modulated pole-number of 8-poles.

All phase-windings provide the M.M.F. waveform of FIG. 14(a) in the unmodulated connection. Phase-winding A is the one phase-winding chosen to be symmetrically modulated. Phase-winding A is modulated by reversal of the phase-winding halves together with the omission from circuit of one coil each of poles 1, 4, 5 and 8 in the modulated connection.

The reversed coils form winding part 21 between terminals 11 and 12, the remaining energised coils form part 22 between terminals 12 and 17a. The omitted coils are numbered 1, 21, 28 and 48. These are serially connected as branch 27 between terminals 12 and 18 and each comprise half the number of turns of double cross-section conductors relative to the remaining coils of the phase-winding.

Hence phase-winding A is represented in unmodulated connection:

+3, +3, +3     +3, +3, +3 and in modulated connection:

+2, +3, +2     −2, −3, −2

Phase-winding B has applied to it the notional modulation wave of FIG. 14(b). This is resolved into the spaced modulation wave components of FIGS. 14(c) and 14(d). The resultant modulation wave applied to phase-winding B is as shown in FIG. 14(e). This wave has its origin substantially at slot 19, as shown in FIG. 14(e).

As described in the section of the specification explaining asymmetrical pole-amplitude modulation with reference to FIG. 14, modulation is effected by omitting from circuit two coils each of poles 2 and 5, as they are numbered in FIG. 14(a). The corresponding coils of FIG. 28 are coils 16, 17, 43 and 44. These are serially connected as branch 28 between terminals 19 and 14.

Hence phase-winding B is represented in unmodulated connection:

$$+3, +3, +3 \quad\quad +3, +3, +3$$

and in modulated connection:

$$0.0.+1, +3, +3 \quad\quad 0.0.-1, -3, -3$$

as described with reference to FIG. 14(e).

The reversed coils of the phase-winding form part 23 between terminals 13 and 14. The remaining coils form part 24 between terminals 14 and 17b.

Phase-winding C is asymmetrically modulated in similar manner to phase-winding B by a resultant modulation wave having its origin substantially at slot 37. To this end, coils 5, 6, 32 and 33 are omitted from circuit in the modulated connection. These are serially connected as branch 29 between terminals 20 and 16.

Hence phase-winding C is represented in unmodulated connection:

$$+3, +3, +3 \quad\quad +3, +3, +3$$

and in modulated connection:

$$+3, +3, +1.0.0 \quad\quad -3, -3, -1.0.0$$

The reversed coils of the phase-winding form part 25 between terminals 15 and 16. The remaining coils form part 26 between terminals 16 and 17c.

In phase-windings B and C also, the omitted coils each comprise half the number of turns of double cross-section conductors relative to the remaining coils of the phase-windings.

The three phase-windings are arranged in parallel-star as shown in FIG. 11(a) for the unmodulated connection and in series-star as shown in FIG. 11(b) for the modulated connection, terminals 17a, 17b and 17c being permanently joined together.

FIG. 25 is the slot winding diagram of the 3-phase, 8-pole unmodulated, fractional slot winding, wound in a 72-slot stator, described earlier with reference to the clock diagram of FIG. 15.

The two halves 21, 22 of phase-winding A are connected respectively between terminals 11, 12 and 12, 17a. The two halves 23, 24 of phase-winding B are connected respectively between terminals 13, 14 and 14, 17b; the two halves 25, 26 of phase-winding C are connected respectively between terminals 15, 16 and 16, 17c.

For modulation, one half of each phase-winding is reversed in circuit relatively to the other half. No coils are omitted from circuit. Terminals 11, 17b, terminals 13, 17c and terminals 15, 17a are permanently connected to each other in pairs. For the unmodulated connection, the three phase-windings are connected in series-delta, terminals 12, 14 and 16 being isolated, as shown in FIG. 12(b). For the modulated connection, the three phase-windings are connected in parallel-star, terminals 12, 14 and 16 being supplied and the three terminals pairs being connected together, as shown in FIG. 12(a).

The phase-band parts reversed on modulation are indicated by the square brackets in both FIG. 15 and FIG. 25.

*Mathematical theory*

The method of pole-changing by pole-amplitude modulation has been fully explained in the preceding text and practical embodiments have been described.

By way of additional explanation of the pole-changing method, trigonometrical equations will now be given representative of the two operations described, first creating two new pole-numbers and then eliminating one.

The space-distributions of the magnetic fields of the three phase-windings A, B and C of a 3-phase machine are respectively given by:

$$\left. \begin{array}{l} B_{\theta_1} = A \sin p\vartheta \\ B_{\theta_2} = A \sin \left( p\vartheta - \dfrac{2\pi}{3} \right) \\ A_{\theta_3} = A \sin \left( p\vartheta - \dfrac{4\pi}{3} \right) \end{array} \right\} \quad (1)$$

and where "A" is the pole amplitude, corresponding to the amplitude "PA" of the waveform diagrams of FIGS. 1 through 4 and FIG. 14.

Suppose then that the pole-amplitude A is space-modulated, for the three phase-windings respectively, according to the three spaced modulation waves:

$$\left. \begin{array}{l} A = M \sin k\vartheta \\ A = M \sin (k\vartheta - \alpha) \\ A = M \sin (k\vartheta - 2\alpha) \end{array} \right\} \quad (2)$$

where "M" is the modulation wave amplitude.

Combining Equations 1 and 2 leads to the following expressions for the magnetic fields of the three phase-windings $$\left. \begin{array}{l} B_{\theta_1} = \dfrac{M}{2} [\cos (p-k)\vartheta - \cos (p+k)\vartheta] \\ B_{\theta_2} = \dfrac{M}{2} \left[ \cos \left[ (p-k)\vartheta - \dfrac{2\pi}{3} + \alpha \right] - \cos \left[ (p+k)\vartheta - \dfrac{2\pi}{3} - \alpha \right] \right] \\ B_{\theta_3} = \dfrac{M}{2} \left[ \cos \left[ (p-k)\vartheta - \dfrac{4\pi}{3} + 2\alpha \right] - \cos \left[ (p+k)\vartheta - \dfrac{4\pi}{3} - 2\alpha \right] \right] \end{array} \right\} \quad (3)$$

If $$\alpha = +\left(\dfrac{2\pi}{3}\right),$$

the first terms in these three expressions are all cophasal, and the second terms are spaced by $$\left(\dfrac{4\pi}{3}\right)$$

together forming a 3-phase magnetic field of $(p+k)$ pole-pairs. This causes the number of pole-pairs to be increased by "$k$" on modulation.

If $$\alpha = -\left(\dfrac{2\pi}{3}\right)$$

the second terms in these three expressions are all cophasal, and the first terms are spaced by $$\alpha = -\left(\dfrac{4\pi}{3}\right)$$

together forming a 3-phase magnetic field of $(p-k)$ pole-pairs. This causes the number of pole-pairs to be decreased by "$k$" on modulation. ($\alpha$ is measured on the scale of $k\vartheta$, the scale of the modulating wave.)

If the phase-sequence, in the sense in which $\pi$ is positive and represented by the Equations 3, is A, B, C, then the value $$\alpha = +\left(\dfrac{2\pi}{3}\right)$$

corresponds to the phase-origin sequence A, B, C and the value $$\alpha = -\left(\frac{2\pi}{3}\right)$$

corresponds to the phase-origin sequence A, C, B as represented in FIGS. 13(b) and 13(c) respectively.

Any pole-combination of $(p_1/p_2)$ poles, of which one is an unmodulated pole-number and the other a modulated pole-number, can thus be obtained in either of two ways. The winding can either be wound originally for $p_1$ poles, either as an integral-slot winding or as a fractional-slot winding, and then modulated to $p_2$ poles; or it can be wound for $p_2$ poles and modulated to $p_1$ poles.

In general, the best overall performance is given when the number of poles is reduced on modulation; and this arrangement is usually to be preferred. When the maximum output is desired at the higher speed, regardless of the reduction of output at the lower speed, it is then better to use modulation to increase the pole-number and reduce the speed. These reciprocal relationships in the general theory of pole-amplitude modulation are important, as an additional degree of freedom in design of pole-changing winding is provided thereby.

TABLE A

| Modulation to Lower Pole—Number | | | Modulation to Higher Pole—Number | | | Pole-Numbers | | | | |
|---|---|---|---|---|---|---|---|---|---|---|
| Symmetrical | Asymmet. | Asymmet. | Asymmet. | Asymmet. | Symmetrical | | | | | |
| Modulated | | | Eliminated | | | 8 | 14 | 20 | 26 | 32 |
| Original | Modulated | | Original | Eliminated | | 4 | 10 | 16 | 22 | 28 | 34 |
| Eliminated | Original | Modulated | Modulated | Original | Eliminated | 6 | 12 | 18 | 24 | 30 | 36 |
| | Eliminated | Original | | Modulated | Original | 8 | 14 | 20 | 26 | 32 | 38 |
| | | Eliminated | | | Modulated | 10 | 16 | 22 | 28 | 34 | 40 |

I claim:

1. A rotary electric machine having a three-phase alternating current winding adapted to provide alternative pole numbers by alternative modes of operation, said alternating current winding being arranged, for operation in a normal, that is unmodulated, mode to provide P poles, in which, for all the three phase-windings, consecutive poles are of alternate polarity and being arranged also for operation in an alternative, that is modulated, mode in which, for one phase-winding, at least part of one half of the phase-winding is reversed in polarity relatively to the corresponding part of the other half of the same phase-winding, whereby an amplitude-modulated magnetomotive force field is established which combines a field component of $(P+2k)$ poles and a field component of $(P-2k)$ poles, where $k$ is an integer and the second and third phase-windings are correspondingly modified to provide second and third amplitude-modulated fields also combining a field component of $(P+2k)$ poles and a field component of $(P-2k)$ poles, the electrical spacing between the three said amplitude-modulated fields being N times 120° subtended at the winding armature axis, where N is a positive or negative integer, including unity, the value of N being so chosen that, in the resultant field due to all three phase-windings, the field component corresponding to one of the two pole numbers $(P+2k)$, $(P-2k)$ is substantially suppressed, the said second and third phase-windings being of a form in which no coil of each particular phase-winding is located at the armature position which is spaced from the corresponding coil of the first phase-winding by the chosen spacing of N times 120° and the said corresponding modification of the second and third phase-windings comprises modifying the effective number of turns of individual coils of each particular phase-winding which are spaced from but located near the said armature position and on both sides thereof, the modified effective number of turns of the individual coils being such that the vector resultant thereof for each of the second and third phase-windings provides a resultant amplitude-modulated field electrically spaced from the amplitude-modulated field of the first phase-winding by the chosen spacing of N times 120°.

2. A rotary electric machine as claimed in claim 1, having a three-phase alternating current winding, the said one phase-winding of which is arranged for operation in the said alternative, that is modulated, mode by the reversal in polarity of the whole of one half of the phase-winding relatively to the other half.

3. A rotary electric machine as claimed in claim 1, having a three-phase alternating current winding, the said one phase-winding of which is arranged for operation in the alternative, that is modulated, mode by the reversal in polarity of one half of the phase-winding relatively to the other half, together with the reduction of the effective numbers of turns of coils at both ends of each half phase-winding.

4. A rotary electric machine as claimed in claim 1, in which the said corresponding modification of the second and third phase-windings comprises modifying the effective number of turns of selected coils of each phase-winding spaced from the said armature position by one phase-band on one side thereof and by two phase-bands on the other side thereof.

5. A rotary electric machine as claimed in claim 4, having a plurality of coils per pole per phase, in which the said spacing of one phase-band and two phase-bands respectively is measured from any coil of a pole of the said one phase-winding to a corresponding coil of the particular second and third phase-windings.

6. A rotary electric machine as claimed in claim 4, in which the modification of the effective number of turns of selected coils of each of the second and third phase-windings consists in making one of the following two changes (i) leaving ⅔ of the turns unchanged and reversing the direction of current in ⅓ of the turns, (ii) leaving ⅓ of the turns unchanged and reversing the direction of current flow in ⅔ of the turns, the change selected being such that the amplitude of the field component spaced from the said armature position by one phase-band is substantially twice the amplitude of the field component spaced from the said armature position by two phase-bands.

7. A rotary electric machine as claimed in claim 5, having a multiple of three coils per pole per phase, in which the said modification of the second and third phase-windings consists of making one of the following two changes (i) leaving ⅔ of the coils unchanged and reversing the direction of current in ⅓ of the coils, (ii) leaving ⅓ of the coils unchanged and reversing the direction of current flow in ⅔ of the coils, the change selected being such that the amplitude of the field component spaced from the said armature position by one phase-band is substantially twice the amplitude of the field component spaced from the said armature position by two phase-bands.

8. A rotary electric machine having a three-phase alternating current winding adapted to provide alternative pole numbers by alternative modes of operation, said alternating current winding being arranged, for operation in a normal, that is unmodulated, mode to provide P poles, in which, for all the three phase-windings, consecutive poles are of alternate polarity and being arranged also for operation in an alternative, that is modulated, mode in which, for one phase-winding, at least part of one half of the phase-winding is reversed in polarity relatively to the corresponding part of the other half of the same phase-winding, whereby an amplitude-modulated magnetomotive field is established which combines a field component of $(P+2k)$ poles and a field component of $(P-2k)$ poles, where $k$ is an integer and the second and third phase-windings are correspondingly modified to provide second and third amplitude-modulated fields also combining a field component of $(P+2k)$ poles and a field component of $(P-2k)$ poles, the electrical spacing between the three said amplitude-modulated fields being N times 120° subtended at the winding armature axis, where N is a positive or negative integer, including unity, the value of N being so chosen that, in the resultant field due to all three phase-windings, the field component corresponding to one of the two pole numbers $(P+2k)$, $(P-2k)$ is substantially suppressed, the said second and third phase-windings being of a form in which no coil of each particular phase-winding is located at the armature position which is spaced from the corresponding coil of the first phase-winding by the chosen spacing of N times 120° and the said corresponding modification of the second and third phase-windings comprises modifying the effective number of turns of individual coils of each particular phase-winding which are spaced from but located near the said armature position and on both sides thereof, the modified effective number of turns of the individual coils being such that the vector resultant thereof for each of the second and third phase-windings provides a resultant amplitude-modulated field electrically spaced from the amplitude-modulated field of the first phase-winding by the chosen spacing of N times 120° and in which, in the said alternative, that is modulated, mode of operation of the phase-windings, the amplitude of the field of the said one phase-winding is reduced substantially to the resultant amplitude of the field due to the second and third phase-windings.

9. A rotary electric machine as claimed in claim 8, in which the said reduction of amplitude of the field of the said one phase-winding is effected by the omission from circuit of turns from each coil of the said one phase-winding.

10. A rotary electric machine as claimed in claim 8, having a plurality of coils per pole per phase, in which the said reduction of amplitude of the field of the said one phase-winding is effected by the omission from circuit of the whole of selected coils of the said one phase-winding.

11. A synchronous electric machine having a three-phase alternating current winding adapted to provide alternative pole numbers by alternative modes of operation, said alternating current winding being arranged, for operation in a normal, that is unmodulated, mode to provide P poles, in which, for all the three phase-winding, consecutive poles are of alternate polarity and being arranged also for operation in an alternative, that is modulated, mode in which, for one phase-winding, at least part of one half of the phase-winding is reversed in polarity relatively to the corresponding part of the other half of the same phase-winding, whereby an amplitude-modulated magnetomotive force field is established which combined a field component of $(P+2k)$ poles and a field component of $(P-2k)$ poles, where $k$ is an integer and the second and third phase-windings are correspondingly modified to provide second and third amplitude-modulated fields also combining a field component of $(P+2k)$ poles and a field component of $(P-2k)$ poles, the electrical spacing between the three said amplitude-modulated fields being N times 120° subtended at the winding armature axis, where N is a positive or negative integer, including unity, the value of N being so chosen that, in the resultant field due to all three phase-windings, the field component corresponding to one of the two pole numbers $(P+2k)$, $(P-2k)$, is substantially suppressed, the said second and third phase-windings being of a form in which no coil of each particular phase-winding is located at the armature position which is spaced from the corresponding coil of the first phase-winding by the chosen spacing of N times 120° and the said corresponding modification of the second and third phase-windings comprises modifying the effective number of turns of individual coils of each particular phase-winding which are spaced from but located near the said armature position and on both sides thereof, the modified effective number of turns of the individual coils being such that the vector resultant thereof for each of the second and third-phase-windings provides a resultant amplitude-modulated field electrically spaced from the amplitude-modulated field of the first phase-winding by the chosen spacing of N times 120° and a D.C. field winding adapted correspondingly to provide alternative pole numbers by alternative modes of operation one said mode of operation providing phantom D.C. poles, said D.C. field winding being provided in two halves, each half extending 180° subtended at the armature axis, the winding being operated, in the mode providing D.C. phantom poles, by reversal of one half of the winding relatively to the other half and reduction in amplitude of each of the four poles at the ends of the two half windings.

12. A synchronous electric machine as claimed in claim 11 in which the four poles at the ends of the two half windings of the D.C. field winding are reduced in amplitude by the omission of some of the turns of each of the coils located at the ends of the two half windings.

13. A method of pole-changing for a polyphase winding for a rotary electric machine, for providing alternative pole-numbers in a selected non-integral ratio, said polyphase winding having a plurality of phase-windings, each phase-winding having a plurality of coils connected together to provide a first pole number, comprising reconnecting said coils to provide two pole-numbers simultaneously in each said phase-winding considered individually and eliminating one of said two pole-numbers from the polyphase field of the said phase-windings considered together, the selected ratio of alternative pole-numbers being the ratio between said first pole-number and that one of said two pole-numbers not eliminated from the polyphase field, said reconnecting of said coils employing only two leads brought out from each phase-winding 14. A method of pole-changing for a polyphase winding for a rotary electric machine, for providing alternative pole-numbers in a selected ratio other than 2:1, said polyphase winding having a plurality of phase-windings each with a plurality of coils connected together for providing a magnetomotive force waveform corresponding to a first pole-number, comprising reconnecting said coils to provide a magnetomotive force waveform corresponding to second and third pole-numbers together in each said phase-winding considered individually, the relative spacing of said phase-windings being predetermined so that the polyphase magnetomotive force waveform of said phase-windings considered together corresponds to a selected one only of said second and third pole-numbers, said reconnecting of said coils employing only two leads brought out from each pase-winding.

15. A method of pole-changing for a polyphase winding for a rotary electric machine, for providing alternative pole-numbers in a selected ratio other than 2:1, said polyphase winding having a plurality of phase-windings each phase-winding being wound as two equal halves disposed sequentially around the winding axis, each half having a plurality of corresponding coils connected together, comprising reconnecting said coils by reversely connecting at least most of the coils of one half of each phase-winding relatively to the corresponding coils of the other half of the phase-winding, thereby providing two pole-numbers together in each said phase-winding considered individually, the disposition around the winding axis of corresponding coils of different phase-windings being such as to eliminate a selected one of said two pole-numbers from the polyphase field of said phase-windings considered together, said reconnecting of said coils employing only two leads brought out from each phase-winding.

16. A method of pole-changing for a polyphase winding for a rotary electric machine, for providing alternative pole-numbers in a selected ratio other than 2:1, said polyphase winding having a plurality of phase-windings following one another around the winding axis in a predetermined phase sequence, each phase-winding comprising a plurality of coils connected together to provide a magnetomotive force waveform corresponding to a first number of poles, comprising modulating the relative amplitudes of said poles according to a cyclic modulation wave having in sequence a positive half-cycle and a negative half-cycle following the origin thereof, thereby to provide a waveform corresponding to second and third pole-numbers together in each phase-winding considered individually, the origins of said modulation waves being spaced apart by substantially one-third, of a revolution around said axis and the phase sequence of the said modulation waves being selected from said predetermined phase sequence and from the reverse sequence thereto, according to which one of said second and third pole-numbers is required to be eliminated from the polyphase field of said phase-windings considered together, the first-mentioned connection of said coils and their connection after the said modulation employing a common connection between all the said phase-windings and additionally only twice the number of phase-winding terminals as there are phase-windings.

17. A method of pole-changing for a three-phase winding for a rotary electric machine, for providing alternative pole-numbers in a selected ratio other than 2:1, said three-phase winding have phase-windings A, B and C with coils connected together to provide a first pole-number and arranged in an electrical phase-sequence A, B, C, comprising reconnecting said coils according to three pole-amplitude modulation waves applied to the three phase-windings in selected sequence and in substantially equal spaced apart relationship, to create second and third pole-numbers together in each phase-winding considered individually, the second pole-number being lower than the first pole-number and the third pole-number being higher than the first pole-number, the second pole-number being eliminated from the three-phase field of the three phase-windings considered together when the selected sequence of said modulation waves relates to phases A, B, C respectively and the third pole-member being eliminated therefrom when the selected sequence of said modulation waves is A, C, B, respectively in the same sense as said electrical phase-sequence A, B, C, said reconnection of said coils employing only six phase-winding terminals.

18. A method of pole-changing for a three-phase winding providing a three-phase field for a rotary electric machine, for providing alternative pole-numbers in a selected ratio, said three-phase winding comprising phase-windings identified A, B and C, each having coils connected together in a first manner to provide P pairs of poles and together forming phase-bands arranged around an axis in sequence, the sequence identified +A, −C, +B, −A, +C, −B defining a reference sense of rotation around the said axis, said pole-changing method comprising connecting together selected ones of said coils in an alternative manner to create two new pole-numbers (P−M) pole-pairs and (P+M) pole-pairs together in each phase-winding considered individually and selecting one of said pole-numbers (P−M) and (P+M) pole-pairs by elimination of the other thereof, from the three-phase field of the phase-windings considered together, the selection of said coils and alternative manner of connection being such as to modulate the relative pole-amplitudes of the said 2P poles of each phase-winding according to three pole-amplitude modulation waves applied one to each phase-winding in spaced relationship and identified A, B and C correspondingly to the phase-windings to which they are applied, each pole-amplitude modulation wave comprising M cycles of alternate positive and negative wave parts following sequentially from a wave origin, said positive and negative parts being identified by the reversal of polarity of the poles of said negative part relative to the poles of said positive part, the spaced relationship of said pole-amplitude modulation waves being such as to locate said wave origins of the three said modulation waves at points spaced apart by substantially one-third of a revolution around the said axis, said three spaced points taken in the said reference sense of rotation around the said axis corresponding to the wave origins of modulation waves A, B, C in sequence when the said pole-number (P−M) pole-pairs is eliminated from the three-phase field and A, C, B in sequence when the said pole-number (P+M) pole-pairs is eliminated, the said selected ratio of alternative pole numbers being the ratio between the said pole-number P and the selected one of said pole-numbers (P−M) and (P+M) and being in a ratio other than 2:1, said first and alternative manners of connection providing alternative series and parallel energisation of the coils of each said phase-winding.

19. A method of pole-changing for a three-phase winding providing a three-phase field for a rotary electric machine, for providing alternative pole-numbers in a selected ratio, said three-phase winding, comprising phase-windings identified A, B and C, each having coils connected together in a first manner to provide P pairs of poles and together forming phase-bands arranged around an axis in sequence, the sequence identified +A, −C, +B, −A, +C, −B defining a reference sense of rotation around the said axis, said pole-changing method comprising connecting together selected ones of said coils in an alternative manner to create two new pole-numbers (P−M) pole-pairs and (P+M) pole-pairs together in each phase-winding considered individually and selecting one of said pole-numbers (P−M) and (P+M) pole-pairs by elimination of the other thereof from the three-phase field of the phase-windings considered together, the selection of said coils and alternative manner of connection being such as to modulate the relative pole-amplitudes of the said 2P poles of each phase-winding according to three pole-amplitude modulation waves applied one to each phase-winding in spaced relationship and identified A, B and C correspondingly to the phase-windings to which they are applied, each pole-amplitude modulation wave comprising M cycles of alternate positive and negative wave parts following sequentially from a wave origin, said positive and negative parts being identified by the reversal of polarity of the poles of said negative part relative to the poles of said positive part, the spaced relationship of said pole-amplitude modulation waves being such as to locate said three spaced points taken in the said reference means of rotation around the said axis corresponding to the wave origins of modulation waves A, B, C in sequence when the said pole-member (P−M) pole-pairs is eliminated from the three-phase field and A, C, B in sequence when the said pole-number (P+M) pole-pairs is eliminated, the said selected ratio of alternative pole numbers being the ratio between the said pole-number P and the selected one of said pole-numbers (P−M) and (P+M) and being in a ratio less than 2:1, said first and alternative manners of connection providing alternative series and parallel energisation of the coils of each said phase-winding.

20. A rotary electric machine having a cooperating rotor and a pole-changing three-phase winding for providing alternative pole-numbers in a selected non-integral ratio, comprising three phase-windings identified A, B, C, each phase-winding having coils connected together for providing a first number of poles, means, including not more than six switching leads brought out from said three-phase winding, for connecting together said coils in an alternative manner to modulate the relative amplitudes of said poles according to three pole-amplitude modulation waves applied one to each phase-winding in substantially equal spaced-apart relationship, each said modulation wave similarly comprising at least one cycle of alternative positive and negative parts, said negative parts corresponding to the connection of selected coils in reverse current-carrying sense relative to the coils of said positive parts, and the sequence of said modulation waves, identified correspondingly as the phase-winding related thereto, being selected from the sequences A, B, C and A, C, B.

21. A three-phase pole-changing synchronous machine as claimed in claim 20, having the said three-phase winding wound on the stator and having a wound rotor direct-current pole-changing field winding.

22. A three-phase pole-changing synchronous machine as claimed in claim 21, wherein the said direct-current field winding is wound as two halves and pole-changing is effected by disconnecting from circuit selected coils from both halves of said field winding to eliminate one pole from each half.

23. A three-phase pole-changing synchronous machine as claimed in claim 21, wherein the said direct-current field winding is wound as two halves and pole-changing is effected by disconnecting from circuit selected coils from both halves of said field winding to reduce in amplitude both end poles of both halves.

24. A rotary electric machine having a cooperating rotor and a three-phase winding providing alternative pole-numbers P and (P+M) pole-pairs, having three phase-windings sequentially arranged around an axis, the electrical phase-sequence A, B, C and phase-band sequence +A, −C, +B, −A, +C, −B defining a reference sense of rotation around said axis, said phase-bands comprising coils connected together in each phase-winding to provide 2P poles, means, including not more than six switching leads brought out from said three-phase winding, for connecting selected ones of said coils in an alternative manner to modulate the relative amplitudes of said 2P poles according to three pole-amplitude modulation waves applied one to each phase-winding in spaced relationship, each pole-amplitude modulation wave comprising M cycles of alternate positive and negative parts following sequentially from an origin, said positive and negative parts being identified by reversal of polarity of the poles of said negative part relative to the poles of said positive part, the spaced relationship of said pole-amplitude modulation waves being such as to space the origins thereof at three points spaced apart substantially one-third of a revolution around said axis, the sequence of said pole-amplitude modulation waves at said three spaced points being in the phase sequence A, B, C in the said reference sense of rotation, the ratio (P+M):P of said alternative pole numbers being other than 2:1.

25. A rotary electric machine having a cooperating rotor and a three-phase winding providing alternative pole-numbers P and (P+M) pole-pairs, having three phase-windings sequentially arranged around an axis, the electrical phase-sequence A, B, C and phase-band sequence +A, −C, +B, −A, +C, −B defining a reference sense of rotation around said axis, said phase-bands comprising coils connected together in each phase-winding to provide 2P poles, means, including not more than six switching leads brought out from said three-phase winding, for connecting selected ones of said coils in an alternative manner to modulate the relative amplitudes of said 2P poles according to three pole-amplitude modulation waves applied one to each phase-winding in spaced relationship, each pole-amplitude modulation wave comprising M cycles of alternate positive and negative parts following sequentially from an origin, said positive and negative parts being identified by reversal of polarity of the poles of said negative part relative to the poles of said positive part, the spaced relationship of said pole-amplitude modulation waves being such as to space the origins thereof at three points spaced apart substantially one-third of a revolution around said axis, the sequence of said pole-amplitude modulation waves at said three spaced points being in the phase sequence A, B, C in the said reference sense of rotation, the ratio (P+M):P of said alternative pole numbers being less than 2:1.

26. A rotating electric machine having a cooperating rotor and a three-phase winding providing alternative pole-numbers P and (P−M) pole-pairs, having three phase-windings sequentially arranged around an axis, the electrical phase sequence A, B, C and phase-band sequence +A, −C, +B, −A, +C, −B defining a reference sense of rotation around said axis, said phase-bands comprising coils connected together in each phase-winding to provide 2P poles, means, including not more than six switching leads brought out from said three-phase winding, for connecting selected ones of said coils in an alternative manner to modulate the relative amplitudes of said 2P poles according to three pole-amplitude modulation waves applied one to each phase-winding in spaced relationship, each pole-amplitude modulation wave comprising M cycles of alternate positive and negative parts following sequentially from an origin, said positive and negative parts being identified by reversal of polarity of the poles of said negative part relative to the poles of said positive part, the spaced relationship of said pole-amplitude modulation waves being such as to space the origins thereof at three points spaced apart substantially one-third of a revolution around said axis, the sequence of said pole-amplitude modulation waves at said three spaced points being in the phase-sequence A, C, B in the said reference sense of rotation, the ratio formed by said alternative pole-numbers P and (P−M) being other than 2:1.

27. A rotary electric machine having a cooperating rotor and a three-phase winding providing alternative pole-numbers P and (P−M) pole-pairs having three phase-windings sequentially arranged around an axis, the electrical phase-sequence A, B, C and phase-band sequence +A, −C, +B, −A, +C, −B defining a reference sense of rotation around said axis, said phase-bands comprising coils connected together in each phase-winding to provide 2P poles, means for connecting selected ones of said coils in an alternative manner to modulate the relative amplitudes of said 2P poles according to three pole-amplitude modulation waves applied one to each phase-winding in spaced relationship, each pole-amplitude modulation wave comprising M cycles of alternate positive and negative parts following sequentially from an origin, said positive and negative parts being identified by reversal of polarity of the poles of said negative part relative to the poles of said positive part, the spaced relationship of said pole-amplitude modulation waves being such as to space the origins thereof at three points spaced apart substantially one-third of a revolution around said axis, the sequence of said pole-amplitude modulation waves at said three spaced points being in the phase sequence A, C, B in the said reference sense of rotation, the ratio formed by said alternative pole-numbers P and (P−M) being less than 2:1.

28. A rotary electric machine having a cooperating rotor and a pole-changing three-phase winding providing a first pole number P pole-pairs and an alternative pole-number selected from the numbers (P−M) and (P+M) pole-pairs, neither said first nor said alternative pole-number being a multiple of three pole-pairs, including three pole-pairs, and the ratio of said first and alternative pole-numbers being other than 2:1, said three-phase windings having three phase-windings in spaced relationship sequentially arranged around an axis, the electrical phase-sequence A, B, C and phase-band sequence +A, −C, +B, −A, +C, −B defining a reference sense of rotation round said axis, said phase-bands comprising coils connected together in each phase winding thus provide 2P poles, means for connecting identically selected coils of each phase-winding in an alternative manner to modulate the relative amplitudes of said 2P poles according to three pole-amplitude modulation waves applied one to each phase-winding, each pole-amplitude modulation wave comprising M cycles of alternate positive and negative parts following sequentially from an origin, said positive and negative parts being identified by reversal of polarity of the poles of said negative part relative to the poles of said positive part, said three modulation waves being applied to the three phase-windings with the origins of the modulation waves located at corresponding points of the three phase-windings and the spaced relationship of said phase-windings being substantially one-third of a revolution around the said axis.

29. A rotary electric machine as claimed in claim 28, providing alternative pole-numbers P and (P+M) pole-pairs, wherein the sequence of said three phase-windings in said reference sense of rotation around the said axis is A, B, C.

30. A rotary electric machine as claimed in claim 28, providing alternative pole-numbers P and (P−M) pole-pairs, wherein the sequence of said three phase-windings in said reference sense of rotation around the said axis is A, C, B.

31. A three-phase pole-changing electric motor having two alternative running speeds in close ratio, corresponding to two alternative pole numbers in a ratio of less than 2:1, and having a field winding comprising three phase windings, each said phase winding being wound in two parts, in which, for one said running speed, the said two parts of each said phase winding are connected to provide consecutive poles of alternate polarity and, for the other running speed, at least the major portion of one said first part only of each phase winding is connected, for the reveres direction of current flow therein for said one running speed, the said phase windings being spaced mechanically to provide 120° electrical spacing between coils of consecutive phase windings at both the alternative pole numbers.

32. A three-phase pole-changing electric motor having two alternative running speeds in close ratio, corresponding to two alternative pole numbers in a ratio of less than 2:1, and having a field winding comprising three phase windings, each said phase winding being wound in two parts in which, for one said running speed, the said two parts of each said phase winding are connected to provide consecutive poles of alternate polarity and, for the other running speed, at least the major portion of one said part only of each phase winding is connected, for the reverse direction of current flow therein, relative to the direction of current flow therein for said one running speed, the said phase windings being spaced mechanically so that corresponding points of consecutive phase windings are spaced by 120°/$k$ mechanical around the motor axis, where $k$ is the number of pole pairs difference between the two alternative pole numbers.

33. A three-phase pole-changing electric motor having two running speeds corresponding respectively to first and second pole-numbers related in a ratio less than 2:1 and differing by $m$ pole pairs, having three phase-windings providing a repeated sequence of phase-bands around the motor axis, each phase-winding comprising $m$ similar winding parts, said parts, for one running speed, being connected by a first series of connections providing said first pole-number and, for the other running speed, being connected by a second series of connections providing a magnetomotive force waveform combining said second pole-number together with a third pole-number also differing from said first pole-number by $m$ pole pairs, the second series of connections differing from the first series by the reversal of selected winding portions and by the optional omission of selected other winding portions and the second series of connections being repeated for each of the $m$ winding parts of the same phase-winding, the three phase-windings being arranged in relation to each other so that corresponding points of the second series of connections, one in each phase-winding, are spaced 120° mechanical around the motor axis, the sequence of the phase-windings at said spaced points being the same as the said sequence of phase-bands around the motor axis if the third pole-number is lower than the second pole-number and opposite thereto if the third pole-number is greater than the second pole-number.

34. A three-phase pole-changing electric motor having two running speeds corresponding respectively to first and second pole-numbers related in a ratio less than 2:1 and differing by $m$ pole pairs, having three phase-windings providing a repeated sequence of phase-bands around the motor axis, each phase-winding comprising $m$ similar winding parts, said parts, for one running speed, being connected by a first series of connections providing said first pole-number and, for the other running speed, being connected by a second series of connections providing a magnetomotive force waveform combining said second pole-number together with a third pole-number also differing from said first pole-number by $m$ pole pairs, the second series of connections differing from the first series by the reversal of selected winding portions and by the omission of selected other winding portions and the second series of connections being repeated for each of the $m$ winding parts of the same phase-winding, the three phase-windings being arranged in relation to each other so that corresponding points of the second series of connections, one in each phase-winding, are spaced 120° mechanical round the motor axis, the sequence of the phase-windings at said spaced points being the same as the said sequence of phase-bands around the motor axis if the third pole-number is lower than the second pole-number and opposite thereto if the third pole-number is greater than the second pole-number.

35. A three-phase pole-changing electric motor having two running speeds corresponding respectively to first and second pole-numbers related in a ratio less than 2:1 and differing by $m$ pole pairs, having three phase-windings providing a repeated sequence of phase-bands around the motor axis, each phase-winding comprising $m$ similar winding parts, said parts, for one running speed, being connected by a first series of connections providing said first pole-number and, for the other running speed, being connected by a second series of connections providing a magnetomotive force waveform combining said second pole-number together with a third pole-number also differing from said first pole-number by $m$ pole pairs, the second series of connections differing from the first series by the reversal of selected winding portions and the second series of connections being repeated for each of the $m$ winding parts of the same phase-winding, the three phase-windings being arranged in relation to each other so that corresponding points of the second series of connections, one in each phase-winding, are spaced 120° mechanical around the motor axis, the sequence of the phase-windings at said spaced points being the same as the said sequence of phase-bands around the motor axis if the third pole-number is lower than the second pole-number and opposite thereto if the third pole-number is greater than the second pole-number.

36. In a three-phase rotary electric machine having three phase-windings with coils wound and connected in circuit to provide a first pole-number, a method of pole-changing to provide a second pole-number, said first and second pole-numbers being related in a ratio less than 2:1 and differing from each other by $m$ pole pairs, where $m$ is an integer, comprising selecting said second pole-number from the two pole-numbers which differ from the first pole-number by $m$ pole pairs, the one being of greater number and the other being of smaller number, arranging the three phase-windings around the axis of the machine, to provide an arbitrary phase-sequence, dividing each phase-winding into $m$ parts spaced apart equally around the machine axis, said division into phase-winding parts starting, for the three phase-windings at three points spaced apart around the machine axis by 120° and following one another in a chosen sequence, dividing each said phase-winding part into a first half and a second half, leaving connected in circuit selected coils of each said phase-winding part comprising at least most the coils of the first half thereof, reversing in circuit selected other coils of each said phase-winding part comprising at least most of the coils of the second half thereof, said selected coils and said selected other coils together providing for each phase-winding a magnetomotive waveform corresponding to both the greater and the smaller of the two said pole-numbers which differ from said first pole-number by $m$ pole pairs, said magnetomotive waveform for each phase-winding having a resultant amplitude substantially zero at said starting point of its division into phase-winding parts, the said chosen sequence of starting points division of the three phase-windings being the same as said arbitrary phase-sequence if the said greater pole-number differing by $m$ pole pairs is selected and being opposite to said arbitrary phase-sequence if the said smaller pole-number is selected as said second pole-number.

References Cited by the Examiner

UNITED STATES PATENTS

| Re. 18,811 | 5/1933 | Alger | 322—62 X |
| 841,609 | 1/1907 | Alexanderson | 318—224 X |
| 2,820,938 | 1/1958 | Davies | 318—224 |

ORIS L. RADER, *Primary Examiner.*

JOHN F. COUCH, *Examiner.*

MILTON O. HIRSHFIELD, G. Z. RUBINSON,
*Assistant Examiners.*